(12) United States Patent
Kawashima

(10) Patent No.: US 10,717,414 B2
(45) Date of Patent: Jul. 21, 2020

(54) WINDSHIELD WIPER BLADE

(71) Applicant: Pylon Manufacturing Corporation, Deerfield Beach, FL (US)

(72) Inventor: Hiroshi Kawashima, Sunrise, FL (US)

(*) Notice: Subject to any disclaimer, the term of this patent is extended or adjusted under 35 U.S.C. 154(b) by 399 days.

(21) Appl. No.: 15/600,180

(22) Filed: May 19, 2017

(65) Prior Publication Data
US 2017/0334400 A1    Nov. 23, 2017

Related U.S. Application Data

(60) Provisional application No. 62/338,821, filed on May 19, 2016, provisional application No. 62/351,035, filed on Jun. 16, 2016.

(51) Int. Cl.
*B60S 1/38* (2006.01)
*B60S 1/40* (2006.01)

(52) U.S. Cl.
CPC ............... *B60S 1/381* (2013.01); *B60S 1/387* (2013.01); *B60S 1/3851* (2013.01); *B60S 1/3858* (2013.01); *B60S 1/3879* (2013.01); *B60S 1/3881* (2013.01); *B60S 1/3882* (2013.01); *B60S 1/4038* (2013.01); *B60S 1/4048* (2013.01); *B60S 1/38* (2013.01); *B60S 1/3889* (2013.01); *B60S 2001/3817* (2013.01); *B60S 2001/3818* (2013.01); *B60S 2001/3836* (2013.01); *B60S 2001/3843* (2013.01);
(Continued)

(58) Field of Classification Search
CPC .... B60S 1/3858; B60S 1/3874; B60S 1/3882; B60S 1/3848; B60S 1/3849; B60S 1/3851; B60S 1/381; B60S 1/3806; B60S 1/3881; B60S 1/38; B60S 2001/3817; B60S 2001/3818; B60S 2001/3843; B60S 2001/3836
USPC ......... 15/250.201, 250.43, 250.451, 250.452
See application file for complete search history.

(56) References Cited

U.S. PATENT DOCUMENTS

| | | |
|---|---|---|
| D56,762 S | 7/1866 | Minier |
| 2,310,751 A | 2/1943 | Scinta |

(Continued)

FOREIGN PATENT DOCUMENTS

| | | |
|---|---|---|
| BR | 102015007588 A2 | 4/2016 |
| DE | 10230457 A1 | 1/2004 |

(Continued)

OTHER PUBLICATIONS

Naedele, M.,"An Access Control Protocol for Embedded Devices," Industrial Informatics, 2006 IEEE International Conference on IEEE, PI, dated Aug. 1, 2006, Retrieved from the Internet URL: http://ieeexplore.ieee.org/document/4053450/, pp. 565-569.

(Continued)

*Primary Examiner* — Gary K. Graham
(74) *Attorney, Agent, or Firm* — The Brickell IP Group, PLLC; Javier Sobrado; A. Robert Weaver

(57) ABSTRACT

A wiper blade having a wiper strip having a wide portion and a lip, and an elongate backing element. The backing element having a top portion, and two opposing legs that descend from the top portion, such that each opposing leg has a claw which extends towards the other opposing leg. A gap formed between the claws that is narrower than a width of the wide portion of the wiper strip. The claws, legs, and top portion define a wiper strip cavity sized to receive the wide portion wiper strip.

20 Claims, 22 Drawing Sheets

(52) U.S. Cl.
CPC .................. *B60S 2001/4032* (2013.01); *B60S 2001/4054* (2013.01); *B60S 2001/4058* (2013.01)

(56) References Cited

U.S. PATENT DOCUMENTS

| | | | |
|---|---|---|---|
| 2,550,094 A | 4/1951 | Smulski | |
| 2,589,339 A | 3/1952 | Carson | |
| 2,616,112 A | 11/1952 | Smulski | |
| 2,643,411 A | 6/1953 | Nesson | |
| 2,658,223 A | 11/1953 | Enochian | |
| 2,799,887 A | 7/1957 | Nemic | |
| 2,801,436 A | 8/1957 | Scinta | |
| 2,814,820 A | 12/1957 | Elliot et al. | |
| 2,890,472 A | 6/1959 | Olson | |
| 2,932,843 A | 4/1960 | Zaiger et al. | |
| 2,937,393 A | 5/1960 | Brueder | |
| 2,946,078 A | 7/1960 | Deibel et al. | |
| 3,029,460 A | 4/1962 | Hoyler | |
| 3,037,233 A | 6/1962 | Peres et al. | |
| 3,056,991 A | 10/1962 | Smithers | |
| 3,082,464 A | 3/1963 | Smithers | |
| 3,088,155 A | 5/1963 | Smithers | |
| 3,089,174 A | 5/1963 | Bignon | |
| 3,104,412 A * | 9/1963 | Hinder ................. | B60S 1/3882 15/250.43 |
| 3,116,510 A | 1/1964 | Oishei et al. | |
| 3,132,367 A | 5/1964 | Wise | |
| 3,139,644 A | 7/1964 | Smith | |
| 3,147,506 A | 9/1964 | Williams | |
| 3,147,507 A | 9/1964 | Glynn | |
| 3,192,551 A | 7/1965 | Appel | |
| 3,234,578 A | 2/1966 | Goulb et al. | |
| 3,296,647 A | 1/1967 | Gumbleton | |
| 3,317,945 A | 5/1967 | Ludwig | |
| 3,317,946 A | 5/1967 | Anderson | |
| 3,350,738 A | 11/1967 | Anderson | |
| D211,570 S | 7/1968 | Tomlin | |
| 3,405,421 A | 10/1968 | Tomlin | |
| 3,418,679 A | 12/1968 | Barth et al. | |
| 3,480,986 A | 12/1969 | Forster | |
| 3,588,941 A | 6/1971 | Schlesinger | |
| 3,588,942 A | 6/1971 | Schlesinger | |
| 3,618,155 A | 11/1971 | Mower | |
| 3,665,544 A | 5/1972 | Sakamoto | |
| 3,673,631 A | 7/1972 | Yamadai et al. | |
| 3,685,086 A | 8/1972 | Froehlich | |
| 3,751,754 A | 8/1973 | Quinlan et al. | |
| 3,757,377 A | 9/1973 | Hayhurst | |
| 3,780,395 A | 12/1973 | Quinlan et al. | |
| 3,857,741 A | 12/1974 | Hultgren et al. | |
| 3,862,465 A | 1/1975 | Ito | |
| 3,872,535 A | 3/1975 | Arman | |
| 3,872,537 A | 3/1975 | Bianchi | |
| 3,879,793 A | 4/1975 | Schlegel | |
| 3,879,794 A | 4/1975 | Roberts, Jr. | |
| 3,881,213 A | 5/1975 | Tilli | |
| 3,881,214 A | 5/1975 | Palu | |
| D236,337 S | 8/1975 | Deibel | |
| 3,929,222 A | 12/1975 | Smith et al. | |
| 3,942,212 A | 3/1976 | Steger et al. | |
| 3,969,784 A | 7/1976 | Journee | |
| D240,809 S | 8/1976 | Deibel | |
| 3,995,347 A | 12/1976 | Kohler | |
| 4,007,511 A | 2/1977 | Deibel | |
| 4,009,504 A | 3/1977 | Arman | |
| 4,028,770 A * | 6/1977 | Appel ....................... | B60S 1/38 15/250.43 |
| RE29,392 E * | 9/1977 | Moorhead ............ | B60S 1/3801 15/250.452 |
| 4,047,480 A | 9/1977 | Vassiliou | |
| 4,063,328 A | 12/1977 | Arman | |
| D248,375 S | 7/1978 | Bergstein | |
| D248,388 S | 7/1978 | Hughes | |
| 4,102,003 A | 7/1978 | Hancu | |
| 4,120,069 A | 10/1978 | Sharp et al. | |
| 4,127,912 A | 12/1978 | Deibel et al. | |
| 4,127,916 A | 12/1978 | van den Berg et al. | |
| D253,040 S | 10/1979 | Fournier et al. | |
| D253,167 S | 10/1979 | Fournier et al. | |
| D257,339 S | 10/1980 | Ellinwood | |
| 4,239,104 A | 12/1980 | Roccaforte et al. | |
| 4,308,635 A | 1/1982 | Maiocco | |
| 4,309,790 A | 1/1982 | Bauer et al. | |
| 4,324,019 A | 4/1982 | Mohnach et al. | |
| 4,327,458 A | 5/1982 | Maiocco | |
| 4,334,001 A | 6/1982 | Horie et al. | |
| 4,339,839 A | 7/1982 | Knights | |
| 4,342,126 A | 8/1982 | Neefeldt | |
| 4,343,063 A | 8/1982 | Batt | |
| 4,343,064 A | 8/1982 | van den Berg et al. | |
| 4,354,293 A | 10/1982 | Le Sausse et al. | |
| D267,939 S | 2/1983 | Duvoux | |
| D267,940 S | 2/1983 | Duvoux | |
| D268,020 S | 2/1983 | Duvoux | |
| 4,400,845 A | 8/1983 | Noguchi et al. | |
| 4,416,032 A | 11/1983 | Mohnach et al. | |
| 4,422,207 A | 12/1983 | Maiocco et al. | |
| 4,438,543 A | 3/1984 | Noguchi et al. | |
| 4,464,808 A | 8/1984 | Berry | |
| 4,547,925 A | 10/1985 | Blackborow et al. | |
| 4,561,143 A | 12/1985 | Beneteau | |
| D282,243 S | 1/1986 | Mason | |
| D282,718 S | 2/1986 | Fireman | |
| 4,570,284 A | 2/1986 | Verton | |
| 4,587,686 A | 5/1986 | Thompson | |
| 4,590,638 A | 5/1986 | Beneteau | |
| D286,499 S | 11/1986 | Moreno | |
| D287,709 S | 1/1987 | Mower et al. | |
| 4,649,591 A | 3/1987 | Guerard | |
| 4,670,284 A | 6/1987 | Berkoff | |
| 4,670,934 A | 6/1987 | Epple et al. | |
| D295,020 S | 4/1988 | Franchi | |
| 4,741,071 A | 5/1988 | Bauer et al. | |
| D296,317 S | 6/1988 | Mower et al. | |
| 4,760,934 A | 8/1988 | Netsch | |
| 4,766,636 A | 8/1988 | Shinpo | |
| D298,116 S | 10/1988 | Sussich | |
| 4,782,547 A | 11/1988 | Mohnach | |
| D298,926 S | 12/1988 | Rusnak | |
| 4,795,288 A | 1/1989 | Sakai | |
| 4,807,326 A | 2/1989 | Arai et al. | |
| D301,329 S | 5/1989 | Cavicchioli | |
| 4,852,206 A | 8/1989 | Fisher | |
| D304,709 S | 11/1989 | Sussich | |
| D307,408 S | 4/1990 | Mower et al. | |
| D308,352 S | 6/1990 | Bradley | |
| D308,660 S | 6/1990 | Fisher | |
| D308,845 S | 6/1990 | Charet et al. | |
| 4,930,180 A | 6/1990 | Longman | |
| D310,193 S | 8/1990 | Charet et al. | |
| 4,971,472 A | 11/1990 | Pethers | |
| 4,976,001 A | 12/1990 | Wright | |
| 4,984,325 A | 1/1991 | Arai et al. | |
| 4,989,290 A | 2/1991 | Hoshino | |
| 5,027,947 A | 7/1991 | Reighart | |
| 5,042,106 A | 8/1991 | Maubray | |
| 5,056,183 A | 10/1991 | Haney, III | |
| 5,062,176 A | 11/1991 | Unterborn et al. | |
| D322,053 S | 12/1991 | Bradley | |
| D322,772 S | 12/1991 | Leu et al. | |
| D322,952 S | 1/1992 | Wu | |
| 5,082,078 A | 1/1992 | Umeda et al. | |
| D323,637 S | 2/1992 | Dipple | |
| D324,014 S | 2/1992 | Ruminer | |
| 5,084,933 A | 2/1992 | Buechele | |
| 5,086,534 A | 2/1992 | Journee | |
| D324,359 S | 3/1992 | Chen | |
| D324,667 S | 3/1992 | Williams | |
| 5,093,954 A | 3/1992 | Kuzuno | |
| D327,013 S | 6/1992 | Reighart | |
| D327,461 S | 6/1992 | Nelson | |
| 5,123,140 A | 6/1992 | Raymond | |
| D327,667 S | 7/1992 | Mar | |

(56) References Cited

U.S. PATENT DOCUMENTS

| | | |
|---|---|---|
| D328,061 S | 7/1992 | Su |
| 5,138,739 A | 8/1992 | Maubray |
| D329,034 S | 9/1992 | Charet et al. |
| D329,997 S | 10/1992 | Leu |
| D330,181 S | 10/1992 | Charet et al. |
| D330,691 S | 11/1992 | Leu |
| D330,696 S | 11/1992 | Alain |
| D331,036 S | 11/1992 | Isley |
| D331,037 S | 11/1992 | Hsi |
| D331,212 S | 11/1992 | Poteet |
| D331,556 S | 12/1992 | Ismert |
| 5,168,596 A | 12/1992 | Maubray |
| 5,170,527 A | 12/1992 | Lyon, II |
| D332,593 S | 1/1993 | Gerardiello et al. |
| 5,179,761 A | 1/1993 | Buechele et al. |
| 5,182,831 A | 2/1993 | Knight |
| D334,161 S | 3/1993 | Wu et al. |
| D334,549 S | 4/1993 | Esquibel |
| 5,206,969 A | 5/1993 | Patterson et al. |
| D336,739 S | 6/1993 | Wu et al. |
| 5,218,735 A | 6/1993 | Maubray |
| 5,228,167 A | 7/1993 | Yang |
| 5,233,721 A | 8/1993 | Yang |
| D341,561 S | 11/1993 | Heckman et al. |
| 5,257,436 A | 11/1993 | Yang |
| D342,225 S | 12/1993 | Heckman et al. |
| 5,276,937 A | 1/1994 | Lan |
| 5,283,925 A | 2/1994 | Maubray |
| D345,329 S | 3/1994 | Kanellis et al. |
| D345,330 S | 3/1994 | Yang |
| D345,537 S | 3/1994 | Bianco et al. |
| D345,538 S | 3/1994 | Bianco et al. |
| 5,289,608 A | 3/1994 | Kim |
| 5,307,536 A | 5/1994 | Lescher |
| 5,311,636 A | 5/1994 | Lee |
| 5,312,177 A | 5/1994 | Coulter |
| D347,610 S | 6/1994 | Charet et al. |
| 5,319,826 A | 6/1994 | Mower |
| 5,325,564 A | 7/1994 | Swanepoel |
| D349,877 S | 8/1994 | Oyama |
| 5,333,351 A | 8/1994 | Sato |
| D350,723 S | 9/1994 | Longazel |
| 5,349,716 A | 9/1994 | Millar |
| 5,361,896 A | 11/1994 | Yang |
| D353,354 S | 12/1994 | Oyama |
| 5,372,449 A | 12/1994 | Bauer et al. |
| 5,383,248 A | 1/1995 | Ho |
| 5,383,249 A | 1/1995 | Yang |
| 5,392,489 A | 2/1995 | Mohnach |
| D357,626 S | 4/1995 | Snow et al. |
| 5,408,719 A | 4/1995 | DeRees et al. |
| 5,412,177 A | 5/1995 | Clark |
| 5,435,041 A | 7/1995 | Ho |
| 5,454,135 A | 10/1995 | Okuya et al. |
| 5,459,900 A | 10/1995 | Mege et al. |
| 5,463,790 A | 11/1995 | Chiou et al. |
| D365,079 S | 12/1995 | Abbott et al. |
| 5,485,650 A | 1/1996 | Swanepoel |
| 5,487,205 A | 1/1996 | Scherch et al. |
| D367,839 S | 3/1996 | Abbott et al. |
| 5,497,528 A | 3/1996 | Wu |
| 5,509,166 A | 4/1996 | Wagner et al. |
| D370,199 S | 5/1996 | Kim |
| 5,519,913 A | 5/1996 | Schedule |
| D370,653 S | 6/1996 | Kim |
| D370,654 S | 6/1996 | Kim |
| D372,217 S | 7/1996 | Abbott et al. |
| 5,564,157 A | 10/1996 | Kushida et al. |
| 5,566,419 A | 10/1996 | Zhou |
| 5,568,670 A | 10/1996 | Samples et al. |
| D375,289 S | 11/1996 | Waselewski et al. |
| 5,577,292 A | 11/1996 | Blachetta et al. |
| D376,792 S | 12/1996 | Chodkiewicz |
| 5,593,125 A | 1/1997 | Storz et al. |
| D377,754 S | 2/1997 | Abbott et al. |
| 5,606,766 A | 3/1997 | Lee |
| 5,628,085 A | 5/1997 | Edele et al. |
| 5,633,932 A | 5/1997 | Davis et al. |
| D379,613 S | 6/1997 | Chen |
| 5,647,088 A | 7/1997 | Bommer et al. |
| D382,848 S | 8/1997 | Chen |
| 5,661,870 A | 9/1997 | Eustache et al. |
| 5,661,871 A | 9/1997 | Scorsiroli |
| D389,449 S | 1/1998 | Hussaini |
| D390,823 S | 2/1998 | Baranowski et al. |
| D392,612 S | 3/1998 | Jonasson et al. |
| 5,732,437 A | 3/1998 | Jonasson et al. |
| D393,619 S | 4/1998 | Jeffer et al. |
| 5,742,973 A | 4/1998 | Kessler |
| D395,271 S | 6/1998 | Kim |
| D395,864 S | 7/1998 | Stahlhut et al. |
| D395,865 S | 7/1998 | Powell et al. |
| D396,840 S | 8/1998 | Vita |
| 5,791,010 A | 8/1998 | Brady et al. |
| 5,819,361 A | 10/1998 | Merkel et al. |
| 5,836,110 A | 11/1998 | Buening |
| D402,953 S | 12/1998 | Kim |
| D404,354 S | 1/1999 | Witek et al. |
| D406,094 S | 2/1999 | Lai |
| D406,257 S | 3/1999 | Lee |
| D406,755 S | 3/1999 | Garganese |
| D406,756 S | 3/1999 | Garganese |
| 5,875,672 A | 3/1999 | Fourie et al. |
| 5,885,023 A | 3/1999 | Witek et al. |
| 5,889,334 A | 3/1999 | Hongo |
| 5,899,334 A | 5/1999 | Domerchie et al. |
| D411,161 S | 6/1999 | Wooten |
| D411,504 S | 6/1999 | Hsu |
| 5,907,885 A | 6/1999 | Tilli et al. |
| 5,911,358 A | 6/1999 | Kenner et al. |
| 5,920,947 A | 7/1999 | Varner |
| D413,261 S | 8/1999 | Yerich |
| D414,456 S | 9/1999 | Hussaini et al. |
| 5,970,569 A | 10/1999 | Merkel et al. |
| 5,970,570 A | 10/1999 | Groninger |
| D417,180 S | 11/1999 | Shih |
| D418,103 S | 12/1999 | Don |
| D418,474 S | 1/2000 | Witek et al. |
| D419,950 S | 2/2000 | Spector |
| 6,026,537 A | 2/2000 | Hojnacki |
| 6,055,697 A | 5/2000 | Wollenschlaeger |
| 6,063,216 A | 5/2000 | Damm et al. |
| D427,134 S | 6/2000 | Lee |
| 6,070,723 A | 6/2000 | Lewis |
| 6,088,872 A | 7/2000 | Schmid et al. |
| D430,097 S | 8/2000 | Breesch et al. |
| 6,101,665 A | 8/2000 | Sahara et al. |
| D431,223 S | 9/2000 | Breesch et al. |
| 6,119,301 A | 9/2000 | Nakatsukasa et al. |
| D431,520 S | 10/2000 | Breesch et al. |
| D432,072 S | 10/2000 | Breesch et al. |
| D434,715 S | 12/2000 | Wang |
| 6,158,078 A | 12/2000 | Kotlarski |
| 6,161,248 A | 12/2000 | Merkel et al. |
| 6,192,546 B1 | 2/2001 | Kotlarski |
| 6,202,251 B1 | 3/2001 | Kotlarski |
| 6,216,311 B1 | 4/2001 | Van Damme et al. |
| D442,537 S | 5/2001 | Kim |
| 6,226,829 B1 | 5/2001 | Kotlarski |
| D443,245 S | 6/2001 | Kim |
| D443,582 S | 6/2001 | De Block |
| D443,854 S | 6/2001 | De Block |
| 6,247,590 B1 | 6/2001 | Baker |
| D444,760 S | 7/2001 | Houssat et al. |
| D445,754 S | 7/2001 | Benoit |
| 6,266,843 B1 | 7/2001 | Doman et al. |
| 6,279,191 B1 | 8/2001 | Kotlarski et al. |
| 6,279,746 B1 | 8/2001 | Hussaini et al. |
| D448,295 S | 9/2001 | Mozes |
| 6,286,176 B1 | 9/2001 | Westermann et al. |
| 6,292,974 B1 | 9/2001 | Merkel et al. |
| 6,295,690 B1 | 10/2001 | Merkel et al. |
| 6,301,742 B1 | 10/2001 | Kota |
| 6,305,066 B1 | 10/2001 | De Paoli et al. |

(56) References Cited

U.S. PATENT DOCUMENTS

| | | |
|---|---|---|
| 6,308,373 B1 | 10/2001 | Merkel et al. |
| 6,327,738 B1 | 12/2001 | Lewis |
| 6,332,236 B1 | 12/2001 | Ku |
| 6,336,243 B1 | 1/2002 | Charng |
| D453,316 S | 2/2002 | Watanabe |
| 6,363,569 B1 | 4/2002 | Kotlarski |
| 6,367,117 B1 | 4/2002 | Sahara et al. |
| D457,479 S | 5/2002 | De Block et al. |
| 6,393,654 B2 | 5/2002 | Nacamuli |
| 6,397,428 B2 | 6/2002 | Kotlarski |
| 6,415,473 B1 | 7/2002 | Rapp |
| D462,044 S | 8/2002 | Gfatter et al. |
| 6,427,282 B1 | 8/2002 | Kotlarski |
| 6,434,780 B1 | 8/2002 | Kotlarski |
| D462,262 S | 9/2002 | Leja |
| 6,449,797 B1 | 9/2002 | De Block |
| 6,453,505 B1 | 9/2002 | Terai |
| D464,012 S | 10/2002 | Hussaini et al. |
| D464,600 S | 10/2002 | Chen |
| 6,499,181 B1 | 12/2002 | Kotlarski |
| D469,731 S | 2/2003 | Geer |
| 6,513,186 B1 | 2/2003 | Zimmer |
| 6,516,491 B2 | 2/2003 | Merkel et al. |
| 6,523,218 B1 | 2/2003 | Kotlarski |
| D471,505 S | 3/2003 | Wang |
| 6,530,111 B1 | 3/2003 | Kotlarski |
| D472,510 S | 4/2003 | Lin |
| D473,180 S | 4/2003 | Sun |
| D473,507 S | 4/2003 | Huang |
| 6,550,096 B1 | 4/2003 | Stewart et al. |
| 6,553,607 B1 | 4/2003 | De Block |
| D474,143 S | 5/2003 | Ho |
| 6,564,441 B2 | 5/2003 | Ibe et al. |
| 6,581,237 B1 | 6/2003 | Kotlarski |
| 6,606,759 B1 | 8/2003 | Hoshino |
| 6,609,267 B1 | 8/2003 | Journee et al. |
| 6,611,988 B1 | 9/2003 | De Block |
| 6,619,094 B2 | 9/2003 | Juhl |
| 6,622,540 B2 | 9/2003 | Jones et al. |
| 6,625,842 B1 | 9/2003 | De Block |
| 6,632,738 B2 | 10/2003 | Sone |
| 6,634,056 B1 | 10/2003 | De Block |
| 6,640,380 B2 | 11/2003 | Rosenstein et al. |
| 6,643,889 B1 | 11/2003 | Kotlarski |
| 6,651,292 B2 | 11/2003 | Komerska |
| 6,665,904 B1 | 12/2003 | Kerchaert |
| 6,668,419 B1 | 12/2003 | Kotlarski |
| 6,675,433 B1 | 1/2004 | Stewart et al. |
| 6,675,434 B1 | 1/2004 | Wilhelm et al. |
| 6,681,440 B2 | 1/2004 | Zimmer et al. |
| D487,047 S | 2/2004 | Kim |
| 6,687,948 B2 | 2/2004 | Kotlarski |
| 6,718,594 B1 | 4/2004 | Kotlarski |
| D490,763 S | 6/2004 | Kim |
| 6,766,906 B2 | 6/2004 | Charng |
| D494,125 S | 8/2004 | Leu |
| D494,527 S | 8/2004 | Hsu |
| D494,528 S | 8/2004 | Chiang |
| 6,785,931 B2 | 9/2004 | Lee et al. |
| 6,789,289 B2 | 9/2004 | Roodt |
| 6,792,644 B2 | 9/2004 | Roodt |
| 6,796,000 B2 | 9/2004 | Varner |
| 6,806,452 B2 | 10/2004 | Bos et al. |
| 6,810,555 B2 | 11/2004 | Ritt |
| 6,810,556 B1 | 11/2004 | Kotlarski |
| 6,813,803 B2 | 11/2004 | Leutsch |
| 6,813,923 B2 | 11/2004 | Jones et al. |
| 6,820,302 B2 | 11/2004 | Zimmer |
| 6,820,303 B2 | 11/2004 | Zimmer et al. |
| 6,820,304 B1 | 11/2004 | Gossez et al. |
| D499,962 S | 12/2004 | Lee et al. |
| D500,728 S | 1/2005 | Leu |
| 6,836,924 B2 | 1/2005 | Egan-Walter |
| 6,836,925 B1 | 1/2005 | Swanepoel |
| 6,836,926 B1 | 1/2005 | De Block |
| 6,836,927 B2 | 1/2005 | De Block et al. |
| D501,819 S | 2/2005 | Hsu |
| 6,857,160 B2 | 2/2005 | Weiler et al. |
| 6,859,971 B2 | 3/2005 | Siklosi |
| 6,874,195 B2 | 4/2005 | Kotlarski et al. |
| 6,883,966 B2 | 4/2005 | Zimmer |
| 6,886,213 B2 | 5/2005 | Merkel et al. |
| 6,904,639 B2 | 6/2005 | Dietrich et al. |
| 6,910,243 B1 | 6/2005 | Zimmer |
| 6,910,244 B2 | 6/2005 | De Block et al. |
| D508,226 S | 8/2005 | Lin |
| D508,888 S | 8/2005 | Carroll |
| 6,944,905 B2 | 9/2005 | De Block et al. |
| 6,946,810 B2 | 9/2005 | Kohlrausch |
| 6,951,043 B1 | 10/2005 | Fehrsen |
| D511,735 S | 11/2005 | Aoyama et al. |
| 6,964,079 B2 | 11/2005 | Zimmer |
| 6,964,080 B2 | 11/2005 | Knauf |
| 6,966,096 B2 | 11/2005 | Baseotto et al. |
| D512,362 S | 12/2005 | Breesch et al. |
| 6,973,698 B1 | 12/2005 | Kotlarski |
| 6,978,511 B2 | 12/2005 | Poton |
| 6,978,512 B2 | 12/2005 | Dietrich et al. |
| 7,007,339 B2 | 3/2006 | Weiler et al. |
| 7,024,722 B2 | 4/2006 | Neubauer et al. |
| 7,036,181 B2 | 5/2006 | Zimmer |
| D522,380 S | 6/2006 | Dibnah et al. |
| 7,055,207 B2 | 6/2006 | Coughlin |
| 7,055,208 B2 | 6/2006 | Merkel et al. |
| 7,076,829 B2 | 7/2006 | Rift |
| D527,336 S | 8/2006 | Van Baelen |
| 7,093,317 B1 | 8/2006 | Zimmer |
| 7,134,163 B2 | 11/2006 | Varner |
| 7,137,167 B2 | 11/2006 | Torii et al. |
| 7,143,463 B2 | 12/2006 | Baseotto et al. |
| 7,150,065 B2 | 12/2006 | Zimmer |
| 7,150,066 B1 | 12/2006 | Huang |
| 7,150,795 B2 | 12/2006 | Javaruski et al. |
| 7,166,979 B2 | 1/2007 | Zimmer |
| 7,171,718 B2 | 2/2007 | Moein et al. |
| D538,218 S | 3/2007 | Elwell et al. |
| 7,196,440 B2 | 3/2007 | Lamprecht |
| 7,207,082 B2 | 4/2007 | Lee |
| 7,228,588 B2 | 6/2007 | Kraemer et al. |
| D546,669 S | 7/2007 | Sheppard et al. |
| D547,713 S | 7/2007 | Goeller |
| D549,151 S | 8/2007 | Janssis et al. |
| D549,152 S | 8/2007 | Goeller |
| 7,256,565 B2 | 8/2007 | Merkel et al. |
| 7,257,856 B2 | 8/2007 | Zimmer |
| 7,258,233 B2 | 8/2007 | Lee |
| 7,272,890 B2 | 9/2007 | Zimmer et al. |
| D552,486 S | 10/2007 | Herring et al. |
| 7,281,294 B2 | 10/2007 | Wilms et al. |
| D556,118 S | 11/2007 | Claes |
| 7,293,321 B2 | 11/2007 | Breesch |
| 7,299,520 B2 | 11/2007 | Huang |
| 7,316,047 B2 | 1/2008 | Thienard |
| 7,316,048 B2 | 1/2008 | Yamane et al. |
| 7,316,087 B1 | 1/2008 | Smith |
| D564,434 S | 3/2008 | Claes |
| D564,955 S | 3/2008 | Claes |
| 7,337,900 B2 | 3/2008 | Reiber et al. |
| 7,341,396 B2 | 3/2008 | Huang |
| 7,353,562 B2 | 4/2008 | Huang |
| D569,327 S | 5/2008 | Lin |
| D569,328 S | 5/2008 | Lin |
| 7,370,385 B2 | 5/2008 | Chiang |
| D573,457 S | 7/2008 | Park |
| 7,398,577 B2 | 7/2008 | Genet |
| D575,146 S | 8/2008 | Lee |
| D577,324 S | 9/2008 | McCray |
| 7,434,291 B2 | 10/2008 | Chiang |
| D579,849 S | 11/2008 | Garrastacho et al. |
| 7,451,520 B2 | 11/2008 | Weiler et al. |
| D582,765 S | 12/2008 | Gustafson et al. |
| 7,461,429 B2 | 12/2008 | Huang |
| 7,464,433 B2 | 12/2008 | Thomar et al. |
| D584,160 S | 1/2009 | Zimmermann |

(56) References Cited

U.S. PATENT DOCUMENTS

| | | |
|---|---|---|
| 7,472,451 B2 | 1/2009 | Hara et al. |
| D586,663 S | 2/2009 | Tidqvist |
| D586,716 S | 2/2009 | Radfar |
| D586,717 S | 2/2009 | Depondt |
| D587,186 S | 2/2009 | Herinckx et al. |
| 7,484,264 B2 | 2/2009 | Kraemer et al. |
| 7,493,672 B2 | 2/2009 | Op't Roodt |
| D588,933 S | 3/2009 | Bonzagni et al. |
| 7,503,095 B2 | 3/2009 | Lin et al. |
| 7,506,401 B2 | 3/2009 | Park |
| 7,509,704 B2 | 3/2009 | Bauer et al. |
| 7,523,519 B2 | 4/2009 | Egner-Walter et al. |
| 7,523,520 B2 | 4/2009 | Breesch |
| 7,523,522 B2 | 4/2009 | Herring et al. |
| D592,121 S | 5/2009 | Bratec et al. |
| 7,526,832 B2 | 5/2009 | Matsumoto et al. |
| 7,527,151 B2 | 5/2009 | Park |
| D593,480 S | 6/2009 | Kim |
| D593,923 S | 6/2009 | Bratec et al. |
| 7,540,061 B1 * | 6/2009 | Huang .................. B60S 1/3881 15/250.201 |
| 7,543,353 B2 | 6/2009 | Ko |
| 7,552,502 B2 | 6/2009 | Kagawa et al. |
| D596,102 S | 7/2009 | Kim |
| 7,559,110 B1 | 7/2009 | Kotlarski et al. |
| D601,077 S | 9/2009 | Kim |
| 7,581,280 B2 | 9/2009 | Op't Roodt et al. |
| 7,581,887 B2 | 9/2009 | Zimmer |
| 7,584,520 B2 | 9/2009 | Hussaini et al. |
| 7,596,479 B2 | 9/2009 | Weiler et al. |
| 7,603,741 B2 | 10/2009 | Verelst et al. |
| 7,603,742 B2 | 10/2009 | Nakano et al. |
| 7,607,194 B2 | 10/2009 | Weber et al. |
| 7,614,499 B2 | 11/2009 | Mueller |
| 7,621,016 B2 | 11/2009 | Verelst et al. |
| 7,628,560 B2 | 12/2009 | Westermann et al. |
| 7,634,833 B2 | 12/2009 | Boland et al. |
| 7,636,980 B2 | 12/2009 | Nakano |
| D608,717 S | 1/2010 | Aglassinger |
| D610,518 S | 2/2010 | Aglassinger |
| D610,519 S | 2/2010 | Aglassinger |
| D610,520 S | 2/2010 | Aglassinger |
| D611,809 S | 3/2010 | Borgerson et al. |
| 7,669,276 B2 | 3/2010 | Verelst et al. |
| 7,687,565 B2 | 3/2010 | Geilenkirchen |
| 7,690,073 B2 | 4/2010 | Marmoy et al. |
| 7,690,509 B2 | 4/2010 | Herring et al. |
| 7,699,169 B2 | 4/2010 | Lewis |
| D615,918 S | 5/2010 | Kim |
| 7,707,680 B2 | 5/2010 | Hawighorst et al. |
| 7,716,780 B2 | 5/2010 | Scholl et al. |
| 7,718,509 B2 | 5/2010 | Endo et al. |
| 7,743,457 B2 | 6/2010 | Metz |
| 7,748,076 B2 | 7/2010 | Weiler et al. |
| D621,322 S | 8/2010 | Lee et al. |
| 7,780,214 B2 | 8/2010 | Kraus et al. |
| 7,788,761 B2 | 9/2010 | Weiler et al. |
| 7,793,382 B2 | 9/2010 | Van De Rovaart |
| 7,797,787 B2 | 9/2010 | Wilms et al. |
| 7,805,800 B2 | 10/2010 | Wilms et al. |
| 7,810,206 B2 | 10/2010 | Weiler et al. |
| 7,814,611 B2 | 10/2010 | Heinrich et al. |
| D627,288 S | 11/2010 | Lee |
| 7,823,953 B2 | 11/2010 | Haas |
| 7,832,045 B2 | 11/2010 | Weiler et al. |
| 7,832,047 B2 | 11/2010 | Hennckx et al. |
| 7,836,542 B2 | 11/2010 | Dietrich et al. |
| 7,849,553 B2 | 12/2010 | Weiler et al. |
| D632,557 S | 2/2011 | Clamagirand et al. |
| 7,886,401 B2 | 2/2011 | Weber et al. |
| 7,891,043 B2 | 2/2011 | Kraus et al. |
| 7,891,044 B2 | 2/2011 | Fink et al. |
| 7,895,702 B2 | 3/2011 | Tisch et al. |
| 7,895,703 B2 | 3/2011 | Ina et al. |
| 7,898,141 B2 | 3/2011 | Hurst et al. |
| 7,899,596 B2 | 3/2011 | Zimmer et al. |
| 7,908,703 B2 | 3/2011 | van Bealen |
| 7,908,704 B2 | 3/2011 | Kraemer |
| 7,921,503 B1 | 4/2011 | Chiang |
| 7,921,504 B1 | 4/2011 | Chiang |
| 7,921,506 B2 | 4/2011 | Baek et al. |
| 7,926,659 B2 | 4/2011 | Kim |
| 7,930,796 B2 | 4/2011 | Weiler et al. |
| D637,132 S | 5/2011 | Kim |
| 7,937,798 B2 | 5/2011 | Fink et al. |
| 7,941,891 B2 | 5/2011 | Breesch |
| 7,941,892 B2 | 5/2011 | Kraus et al. |
| 7,945,985 B2 | 5/2011 | Stubner |
| 7,945,987 B2 | 5/2011 | Verelst et al. |
| 7,950,717 B2 | 5/2011 | Metz |
| 7,962,787 B2 | 6/2011 | Camilleri et al. |
| 7,966,689 B2 | 6/2011 | Rovaart et al. |
| 7,971,312 B2 | 7/2011 | Crabbee et al. |
| 7,975,849 B2 | 7/2011 | Kim |
| 7,979,950 B2 | 7/2011 | Boland |
| 7,989,955 B2 | 8/2011 | Yagi |
| 7,989,995 B2 | 8/2011 | Reith et al. |
| 7,992,248 B2 | 8/2011 | Koppen et al. |
| 7,996,953 B2 | 8/2011 | Braun et al. |
| D644,925 S | 9/2011 | Jaworski |
| 8,020,246 B2 | 9/2011 | Bauer et al. |
| 8,020,248 B2 | 9/2011 | Hasegawa |
| 8,020,249 B2 | 9/2011 | Masuda et al. |
| 8,024,836 B2 | 9/2011 | Moll et al. |
| 8,026,645 B2 | 9/2011 | Stubner et al. |
| D647,451 S | 10/2011 | Lin |
| 8,042,690 B2 | 10/2011 | Lewis |
| D647,795 S | 11/2011 | Eaton et al. |
| 8,051,526 B2 | 11/2011 | Summerville et al. |
| 8,060,976 B2 | 11/2011 | Mayer et al. |
| 8,069,528 B2 | 12/2011 | Verelst et al. |
| 8,076,807 B2 | 12/2011 | Bohn et al. |
| D651,509 S | 1/2012 | Methe et al. |
| 8,096,013 B2 | 1/2012 | Eschenbrenner et al. |
| 8,099,823 B2 | 1/2012 | Kraemer et al. |
| 8,104,134 B2 | 1/2012 | Ritt |
| 8,104,136 B2 | 1/2012 | Carangelo |
| 8,117,710 B2 | 2/2012 | Kraus et al. |
| 8,125,111 B2 | 2/2012 | Bohn et al. |
| 8,141,198 B2 | 3/2012 | Wilms et al. |
| 8,148,467 B2 | 4/2012 | Pieters et al. |
| 8,151,656 B2 | 4/2012 | Nicgorski, II |
| 8,156,604 B2 | 4/2012 | Kraus et al. |
| 8,156,605 B2 | 4/2012 | Dietrich et al. |
| 8,165,796 B2 | 4/2012 | Hoetzer |
| D658,494 S | 5/2012 | Raimer et al. |
| 8,166,605 B2 | 5/2012 | Lee |
| 8,169,791 B2 | 5/2012 | Wolf et al. |
| 8,180,518 B2 | 5/2012 | Petricoin, Jr. |
| 8,181,305 B2 | 5/2012 | Boos |
| 8,181,306 B2 | 5/2012 | Merkel |
| 8,181,307 B2 | 5/2012 | Wilms et al. |
| 8,181,308 B2 | 5/2012 | Kwon et al. |
| 8,186,002 B2 | 5/2012 | Kinnaert et al. |
| 8,191,200 B2 | 6/2012 | Kim |
| 8,191,201 B2 | 6/2012 | De Block et al. |
| 8,196,253 B2 | 6/2012 | Barlas |
| 8,196,254 B2 | 6/2012 | Mahfoudh et al. |
| 8,196,255 B2 | 6/2012 | De Block et al. |
| 8,205,290 B2 | 6/2012 | Weiler et al. |
| 8,205,291 B2 | 6/2012 | Eschenbrenner et al. |
| 8,214,965 B2 | 7/2012 | Volz et al. |
| 8,230,547 B2 | 7/2012 | Wilms et al. |
| 8,234,746 B2 | 8/2012 | Lutterodt et al. |
| 8,245,350 B2 | 8/2012 | Van De Rostyne et al. |
| 8,256,851 B2 | 9/2012 | Pelosse |
| 8,261,403 B2 | 9/2012 | Ehde |
| 8,261,405 B2 | 9/2012 | Kim et al. |
| 8,261,628 B2 | 9/2012 | Moecklin et al. |
| 8,266,759 B2 | 9/2012 | Braun et al. |
| 8,272,096 B2 | 9/2012 | Wilms et al. |
| 8,272,360 B2 | 9/2012 | Hartmann et al. |
| 8,286,533 B2 | 10/2012 | Hurst et al. |
| 8,294,327 B2 | 10/2012 | Chaumet et al. |

(56) References Cited

U.S. PATENT DOCUMENTS

| | | |
|---|---|---|
| D671,827 S | 12/2012 | Raimer et al. |
| 8,322,456 B2 | 12/2012 | Pozgay et al. |
| 8,327,500 B2 | 12/2012 | De Block et al. |
| 8,328,011 B2 | 12/2012 | Skurdalsvold et al. |
| 8,333,093 B2 | 12/2012 | Kleckner et al. |
| D674,733 S | 1/2013 | Lee |
| 8,341,799 B2 | 1/2013 | Koppen et al. |
| 8,347,449 B2 | 1/2013 | Genet et al. |
| 8,356,520 B2 | 1/2013 | Hurst et al. |
| 8,359,701 B2 | 1/2013 | De Block et al. |
| 8,361,595 B2 | 1/2013 | Van De Rostyne et al. |
| 8,370,986 B2 | 2/2013 | Wilms et al. |
| 8,370,987 B2 | 2/2013 | Ritt |
| 8,370,988 B2 | 2/2013 | Kraus et al. |
| 8,373,322 B2 | 2/2013 | Wegner et al. |
| 8,375,503 B2 | 2/2013 | Aznag |
| 8,381,348 B2 | 2/2013 | Egner-Walter et al. |
| 8,381,349 B2 | 2/2013 | Ku |
| 8,381,350 B2 | 2/2013 | Op't Roodt et al. |
| 8,397,340 B2 | 3/2013 | Weiler et al. |
| 8,397,341 B2 | 3/2013 | Ehde |
| D679,234 S | 4/2013 | Depondt |
| D679,235 S | 4/2013 | Depondt |
| D680,051 S | 4/2013 | Tolentino et al. |
| 8,410,651 B2 | 4/2013 | Lauk |
| 8,413,291 B2 | 4/2013 | Wu |
| 8,413,292 B2 | 4/2013 | Yang et al. |
| 8,418,644 B2 | 4/2013 | Fiedor et al. |
| 8,424,149 B2 | 4/2013 | Coemans et al. |
| 8,429,786 B2 | 4/2013 | Van Baelen et al. |
| 8,434,621 B2 | 5/2013 | Hun et al. |
| 8,448,289 B2 | 5/2013 | Reith et al. |
| 8,448,290 B2 | 5/2013 | Op't Roodt et al. |
| D684,862 S | 6/2013 | DiFranza |
| 8,453,292 B2 | 6/2013 | Jeon |
| D685,260 S | 7/2013 | Thielemier |
| D686,912 S | 7/2013 | Ehde et al. |
| 8,474,088 B2 | 7/2013 | Wu |
| 8,484,794 B2 | 7/2013 | Westermann et al. |
| 8,490,239 B2 | 7/2013 | Ehde |
| 8,495,787 B2 | 7/2013 | Garrastacho |
| 8,499,408 B2 | 8/2013 | Boland |
| 8,505,151 B2 | 8/2013 | Depondt et al. |
| 8,505,152 B2 | 8/2013 | Boland |
| 8,505,724 B2 | 8/2013 | Bult et al. |
| 8,510,895 B2 | 8/2013 | Beelen et al. |
| 8,510,897 B2 | 8/2013 | Ku |
| 8,510,898 B2 | 8/2013 | Ku |
| 8,522,393 B2 | 9/2013 | Boland |
| 8,539,634 B2 | 9/2013 | Wilms et al. |
| 8,544,136 B2 | 10/2013 | Kraemer et al. |
| 8,544,137 B2 | 10/2013 | Thienard |
| 8,549,695 B2 | 10/2013 | Reith et al. |
| 8,552,113 B2 | 10/2013 | Pieters et al. |
| 8,555,455 B2 | 10/2013 | Boland |
| 8,555,456 B2 | 10/2013 | Ehde |
| 8,561,717 B2 | 10/2013 | Pozgay et al. |
| D692,750 S | 11/2013 | Ehde et al. |
| D692,818 S | 11/2013 | Tolentino et al. |
| D692,819 S | 11/2013 | Tolentino et al. |
| D693,213 S | 11/2013 | Lee et al. |
| 8,574,791 B2 | 11/2013 | Maus et al. |
| 8,575,078 B2 | 11/2013 | Duval et al. |
| 8,581,530 B2 | 11/2013 | Tisch |
| 8,582,809 B2 | 11/2013 | Halimeh et al. |
| 8,584,303 B2 | 11/2013 | Wolfgarten et al. |
| 8,590,097 B2 | 11/2013 | Bohn et al. |
| D695,632 S | 12/2013 | Akana et al. |
| 8,595,888 B2 | 12/2013 | Op't Roodt |
| 8,595,889 B2 | 12/2013 | Op't Roodt et al. |
| 8,613,357 B2 | 12/2013 | Putnam |
| D697,790 S | 1/2014 | Iwegbu |
| 8,646,181 B2 | 2/2014 | Baumann et al. |
| D700,524 S | 3/2014 | Ferriter |
| 8,661,602 B2 | 3/2014 | Op't Roodt et al. |
| D702,619 S | 4/2014 | Kim |
| 8,686,612 B2 | 4/2014 | Roos et al. |
| 8,707,506 B1 | 4/2014 | Wu |
| D704,127 S | 5/2014 | Depondt |
| D704,128 S | 5/2014 | Depondt |
| D704,129 S | 5/2014 | Depondt |
| D704,619 S | 5/2014 | Kim |
| D704,620 S | 5/2014 | Kim |
| 8,717,011 B2 | 5/2014 | Henning |
| 8,719,994 B2 | 5/2014 | Thienard et al. |
| 8,720,033 B2 | 5/2014 | Koppen et al. |
| 8,728,367 B2 | 5/2014 | Lay et al. |
| D706,200 S | 6/2014 | Tolentino et al. |
| D706,201 S | 6/2014 | Depondt |
| D706,202 S | 6/2014 | Depondt |
| 8,745,812 B2 | 6/2014 | Kruse et al. |
| 8,745,813 B2 | 6/2014 | Ishida et al. |
| 8,749,186 B2 | 6/2014 | Stubner et al. |
| 8,759,449 B2 | 6/2014 | Pieters et al. |
| D708,890 S | 7/2014 | Kim et al. |
| D709,362 S | 7/2014 | Kim |
| 8,769,762 B2 | 7/2014 | Op't Roodt et al. |
| 8,770,063 B2 | 7/2014 | Bhatti |
| 8,782,847 B2 | 7/2014 | Depondt |
| D711,217 S | 8/2014 | Jacobs et al. |
| 8,800,097 B2 | 8/2014 | Wegner et al. |
| 8,800,099 B2 | 8/2014 | Boland |
| 8,806,700 B2 | 8/2014 | Tolentino et al. |
| 8,813,608 B2 | 8/2014 | Hurst et al. |
| 8,823,228 B2 | 9/2014 | Mili et al. |
| 8,839,483 B2 | 9/2014 | Roodt et al. |
| D714,635 S | 10/2014 | Demar et al. |
| D715,142 S | 10/2014 | Allen et al. |
| 8,850,653 B2 | 10/2014 | Depondt |
| 8,854,455 B2 | 10/2014 | Haug |
| 8,857,595 B2 | 10/2014 | Mill et al. |
| 8,863,370 B2 | 10/2014 | Weiler et al. |
| 8,871,994 B2 | 10/2014 | Wei et al. |
| D717,225 S | 11/2014 | Kuo |
| 8,881,338 B2 | 11/2014 | Thielen et al. |
| 8,893,348 B2 | 11/2014 | Vankerkhove et al. |
| 8,909,421 B2 | 12/2014 | Zimmer |
| 8,913,132 B2 | 12/2014 | Seger et al. |
| 8,913,133 B2 | 12/2014 | Huelsen et al. |
| 8,917,323 B2 | 12/2014 | Seger et al. |
| 8,931,133 B2 | 1/2015 | Coart et al. |
| 8,935,056 B2 | 1/2015 | Zimmer |
| 8,938,847 B2 | 1/2015 | Avasiloaie et al. |
| 8,950,034 B2 | 2/2015 | Wilms |
| 8,950,035 B2 | 2/2015 | Benner et al. |
| 8,957,619 B2 | 2/2015 | Karcher |
| 8,963,464 B2 | 2/2015 | Braun et al. |
| D725,025 S | 3/2015 | Poton |
| 8,973,207 B2 | 3/2015 | Depondt |
| 8,973,209 B2 | 3/2015 | Depondt |
| 8,979,066 B2 | 3/2015 | Pfetzer et al. |
| 8,984,707 B2 | 3/2015 | Boland |
| 8,985,241 B2 | 3/2015 | Pozgay et al. |
| 8,997,304 B2 | 4/2015 | Oslizlo et al. |
| 9,003,594 B2 | 4/2015 | Guidez |
| 9,003,596 B2 | 4/2015 | Avasiloaie et al. |
| 9,008,905 B2 | 4/2015 | Prskawetz et al. |
| 9,015,896 B2 | 4/2015 | De Block |
| 9,018,877 B2 | 4/2015 | Braun et al. |
| 9,021,651 B2 | 5/2015 | Wolfgarten |
| 9,021,652 B2 | 5/2015 | Coemans et al. |
| 9,045,111 B2 | 6/2015 | Zimmer |
| 9,045,113 B2 | 6/2015 | Aznag et al. |
| 9,050,946 B2 | 6/2015 | Zimmer et al. |
| 9,056,595 B2 | 6/2015 | Wegner et al. |
| 9,071,089 B2 | 6/2015 | Kastinger et al. |
| 9,073,519 B2 | 7/2015 | Depondt |
| 9,079,567 B2 | 7/2015 | Wegner et al. |
| 9,096,196 B2 | 8/2015 | Criel et al. |
| 9,108,595 B2 | 8/2015 | Tolentino et al. |
| 9,114,754 B2 | 8/2015 | Ehlgen et al. |
| 9,114,783 B2 | 8/2015 | Depondt |
| 9,120,463 B2 | 9/2015 | Kim et al. |
| 9,120,464 B2 | 9/2015 | Pack et al. |

(56) References Cited

U.S. PATENT DOCUMENTS

| | | |
|---|---|---|
| 9,151,372 B2 | 10/2015 | Keller |
| 9,174,609 B2 | 11/2015 | Tolentino et al. |
| 9,174,611 B2 | 11/2015 | Tolentino et al. |
| 9,180,839 B2 | 11/2015 | Oslizlo et al. |
| D744,331 S | 12/2015 | Vos et al. |
| 9,211,867 B2 | 12/2015 | Beelen et al. |
| 9,211,868 B2 | 12/2015 | Bousset et al. |
| 9,225,274 B2 | 12/2015 | Lingenfelser et al. |
| D746,700 S | 1/2016 | Boehnen et al. |
| 9,227,596 B2 | 1/2016 | Van De Rovaart et al. |
| 9,227,598 B2 | 1/2016 | Smets et al. |
| 9,233,664 B2 | 1/2016 | Weidlich |
| 9,254,820 B2 | 2/2016 | Geubel et al. |
| 9,260,085 B2 | 2/2016 | Bex et al. |
| 9,266,504 B2 | 2/2016 | De Block |
| 9,272,676 B2 | 3/2016 | Heger et al. |
| D765,501 S | 9/2016 | Peers et al. |
| 9,505,380 B2 | 11/2016 | Tolentino et al. |
| D777,079 S | 1/2017 | Tolentino et al. |
| D784,804 S | 4/2017 | Peers et al. |
| D787,308 S | 5/2017 | Kawashima et al. |
| D787,312 S | 5/2017 | Peers et al. |
| D796,413 S | 9/2017 | Di Iulio |
| 2001/0013236 A1 | 8/2001 | Weyerstall et al. |
| 2002/0043092 A1 | 4/2002 | Jones et al. |
| 2002/0112306 A1 | 8/2002 | Komerska |
| 2002/0174505 A1 | 11/2002 | Kim |
| 2002/0192017 A1 | 12/2002 | Rosenstein et al. |
| 2003/0014828 A1 | 1/2003 | Edner-Walter et al. |
| 2003/0028990 A1 | 2/2003 | Zimmer |
| 2003/0033683 A1 | 2/2003 | Kotlarski |
| 2003/0074763 A1 | 4/2003 | Egner-Walter et al. |
| 2003/0159229 A1 | 8/2003 | Weiler et al. |
| 2003/0209049 A1 | 11/2003 | Jones et al. |
| 2003/0221276 A1 | 12/2003 | Siklosi |
| 2003/0229961 A1 | 12/2003 | Barnett |
| 2004/0010882 A1 | 1/2004 | Breesch |
| 2004/0025280 A1 | 2/2004 | Krickau et al. |
| 2004/0025281 A1 | 2/2004 | Baseotto et al. |
| 2004/0052577 A1 | 3/2004 | Lee et al. |
| 2004/0098821 A1 | 5/2004 | Kraemer et al. |
| 2004/0159994 A1 | 8/2004 | Lenzen et al. |
| 2004/0211021 A1 | 10/2004 | Weber et al. |
| 2004/0244137 A1 | 12/2004 | Poton |
| 2004/0250369 A1 | 12/2004 | Matsumoto et al. |
| 2005/0005387 A1 | 1/2005 | Kinoshita et al. |
| 2005/0011033 A1 | 1/2005 | Thomar et al. |
| 2005/0039292 A1 | 2/2005 | Boland |
| 2005/0166349 A1 | 8/2005 | Nakano et al. |
| 2005/0177970 A1 | 8/2005 | Scholl et al. |
| 2005/0252812 A1 | 11/2005 | Lewis |
| 2006/0010636 A1 | 1/2006 | Vacher |
| 2006/0026786 A1 | 2/2006 | Ku |
| 2006/0112511 A1 | 6/2006 | Op't Roodt et al. |
| 2006/0117515 A1 | 6/2006 | Fink et al. |
| 2006/0130263 A1 | 6/2006 | Coughlin |
| 2006/0156529 A1 | 7/2006 | Thomar et al. |
| 2006/0179597 A1 | 8/2006 | Hoshino et al. |
| 2006/0218740 A1 | 10/2006 | Coughlin |
| 2006/0230571 A1 | 10/2006 | Son |
| 2006/0248675 A1 | 11/2006 | Vacher et al. |
| 2006/0282972 A1 | 12/2006 | Huang |
| 2007/0017056 A1 | 1/2007 | Cooke et al. |
| 2007/0067939 A1 | 3/2007 | Huang |
| 2007/0067941 A1 | 3/2007 | Huang |
| 2007/0089257 A1 | 4/2007 | Harita et al. |
| 2007/0089527 A1 | 4/2007 | Shank et al. |
| 2007/0186366 A1 | 8/2007 | Alley |
| 2007/0220698 A1 | 9/2007 | Huang |
| 2007/0226940 A1 | 10/2007 | Thienard |
| 2007/0226941 A1 | 10/2007 | Kraemer et al. |
| 2007/0234501 A1 | 10/2007 | Ho et al. |
| 2007/0266517 A1 | 11/2007 | Kim et al. |
| 2008/0052865 A1 | 3/2008 | Chiang |
| 2008/0083082 A1 | 4/2008 | Rovaart et al. |
| 2008/0086830 A1 | 4/2008 | Kim |
| 2008/0092320 A1 | 4/2008 | Cempura et al. |
| 2008/0098554 A1 | 5/2008 | Cho |
| 2008/0098559 A1 | 5/2008 | Machida et al. |
| 2008/0115308 A1 | 5/2008 | Lee |
| 2008/0148509 A1 | 6/2008 | Bacarella et al. |
| 2008/0196192 A1 | 8/2008 | Yao |
| 2008/0222830 A1 | 9/2008 | Chiang |
| 2008/0222831 A1 | 9/2008 | Thienard |
| 2008/0222832 A1* | 9/2008 | Huang .................. B60S 1/3806 15/250.43 |
| 2008/0263805 A1 | 10/2008 | Sebring |
| 2008/0289133 A1 | 11/2008 | Kim |
| 2009/0007364 A1 | 1/2009 | Jarasson et al. |
| 2009/0013492 A1 | 1/2009 | Henin |
| 2009/0056049 A1 | 3/2009 | Jarasson et al. |
| 2009/0064440 A1 | 3/2009 | Boland |
| 2009/0126140 A1 | 5/2009 | Heinrich et al. |
| 2009/0151110 A1 | 6/2009 | Ku |
| 2009/0158545 A1 | 6/2009 | Grasso et al. |
| 2009/0158547 A1 | 6/2009 | Kim |
| 2009/0172910 A1 | 7/2009 | De Block et al. |
| 2009/0178226 A1 | 7/2009 | Lee et al. |
| 2009/0197047 A1 | 8/2009 | Teranishi |
| 2009/0199357 A1 | 8/2009 | Thienard |
| 2010/0000041 A1 | 1/2010 | Boland |
| 2010/0005608 A1 | 1/2010 | Chien |
| 2010/0005609 A1 | 1/2010 | Kim |
| 2010/0024149 A1 | 2/2010 | Erdal |
| 2010/0024151 A1 | 2/2010 | Ku |
| 2010/0050360 A1 | 3/2010 | Chiang |
| 2010/0050361 A1 | 3/2010 | Chang et al. |
| 2010/0064468 A1 | 3/2010 | Kang |
| 2010/0083454 A1 | 4/2010 | Op't Roodt et al. |
| 2010/0186185 A1 | 7/2010 | Grasso et al. |
| 2010/0205763 A1 | 8/2010 | Ku |
| 2010/0212101 A1 | 8/2010 | Thienard et al. |
| 2010/0236008 A1 | 9/2010 | Yang et al. |
| 2010/0236675 A1 | 9/2010 | Schneider |
| 2010/0242204 A1 | 9/2010 | Chien |
| 2010/0251502 A1 | 10/2010 | Summerville et al. |
| 2010/0281645 A1 | 11/2010 | Kim |
| 2011/0005020 A1 | 1/2011 | Koppen et al. |
| 2011/0041280 A1 | 2/2011 | Choi et al. |
| 2011/0047742 A1 | 3/2011 | Kim et al. |
| 2011/0072607 A1 | 3/2011 | Van Bealen et al. |
| 2011/0107542 A1 | 5/2011 | Op't Roodt |
| 2011/0113582 A1 | 5/2011 | Kruse et al. |
| 2011/0113583 A1 | 5/2011 | Shanmugham et al. |
| 2011/0162161 A1 | 7/2011 | Amado |
| 2011/0192511 A1 | 8/2011 | Marrone |
| 2011/0219563 A1 | 9/2011 | Guastella et al. |
| 2011/0277264 A1 | 11/2011 | Ehde |
| 2011/0277266 A1 | 11/2011 | Umeno |
| 2012/0027206 A1 | 2/2012 | Suzuki et al. |
| 2012/0030894 A1 | 2/2012 | Garrastacho et al. |
| 2012/0047673 A1 | 3/2012 | Depondt |
| 2012/0054976 A1 | 3/2012 | Yang et al. |
| 2012/0060316 A1 | 3/2012 | Avasiloaie et al. |
| 2012/0066857 A1 | 3/2012 | Webert |
| 2012/0090123 A1* | 4/2012 | Caillot .................... B60S 1/381 15/250.04 |
| 2012/0102669 A1 | 5/2012 | Lee et al. |
| 2012/0144615 A1 | 6/2012 | Song et al. |
| 2012/0159733 A1 | 6/2012 | Kwon |
| 2012/0180245 A1 | 7/2012 | Ku |
| 2012/0180246 A1 | 7/2012 | Ku |
| 2012/0186035 A1 | 7/2012 | Lee |
| 2012/0266405 A1 | 10/2012 | Tolentinto et al. |
| 2012/0279008 A1 | 11/2012 | Depondt |
| 2012/0311808 A1 | 12/2012 | Yang et al. |
| 2012/0317740 A1 | 12/2012 | Yang et al. |
| 2013/0025084 A1 | 1/2013 | Tolentino et al. |
| 2013/0067674 A1 | 3/2013 | Chiang |
| 2013/0067675 A1 | 3/2013 | Chien |
| 2013/0067678 A1 | 3/2013 | Ehde |
| 2013/0104334 A1 | 5/2013 | Depondt |
| 2013/0117957 A1 | 5/2013 | Ku |
| 2013/0125333 A1 | 5/2013 | Tolentino et al. |

(56) References Cited

U.S. PATENT DOCUMENTS

| | | |
|---|---|---|
| 2013/0152323 A1 | 6/2013 | Chien |
| 2013/0152326 A1 | 6/2013 | Oslizlo et al. |
| 2013/0152330 A1 | 6/2013 | Kim et al. |
| 2013/0167316 A1 | 7/2013 | Egner-Walter et al. |
| 2013/0185889 A1 | 7/2013 | Tolentino et al. |
| 2013/0185890 A1 | 7/2013 | Ku |
| 2013/0192015 A1 | 8/2013 | Tolentino et al. |
| 2013/0192016 A1 | 8/2013 | Kim et al. |
| 2013/0198992 A1 | 8/2013 | Tolentino et al. |
| 2013/0205532 A1 | 8/2013 | Tolentino et al. |
| 2013/0212828 A1 | 8/2013 | Coughlin |
| 2013/0219649 A1 | 8/2013 | Tolentino et al. |
| 2013/0227809 A1 | 9/2013 | Tolentinto et al. |
| 2013/0227810 A1 | 9/2013 | Tolentinto et al. |
| 2013/0247323 A1 | 9/2013 | Geubel et al. |
| 2013/0255026 A1 | 10/2013 | Depondt |
| 2013/0263400 A1 | 10/2013 | Duesterhoeft et al. |
| 2013/0291329 A1 | 11/2013 | Izabel |
| 2013/0298348 A1 | 11/2013 | Caillot et al. |
| 2013/0305475 A1 | 11/2013 | Kim et al. |
| 2013/0305478 A1 | 11/2013 | Kim et al. |
| 2013/0333145 A1 | 12/2013 | Depondt |
| 2013/0333146 A1 | 12/2013 | Depondt |
| 2014/0026348 A1 | 1/2014 | Schaeuble |
| 2014/0026349 A1 | 1/2014 | Schaeuble |
| 2014/0026350 A1 | 1/2014 | Boland |
| 2014/0068886 A1 | 3/2014 | Ku |
| 2014/0082875 A1 | 3/2014 | Peers et al. |
| 2014/0115811 A1 | 5/2014 | Kim et al. |
| 2014/0130283 A1 | 5/2014 | Boland et al. |
| 2014/0130287 A1 | 5/2014 | Bex et al. |
| 2014/0150198 A1 | 6/2014 | Kim et al. |
| 2014/0182075 A1 | 7/2014 | Polocoser et al. |
| 2014/0196241 A1 | 7/2014 | Kim et al. |
| 2014/0259504 A1 | 9/2014 | Piotrowski et al. |
| 2014/0259505 A1 | 9/2014 | Fournier et al. |
| 2014/0283325 A1 | 9/2014 | Kawashima et al. |
| 2014/0317875 A1 | 10/2014 | Tolentino et al. |
| 2014/0338144 A1 | 11/2014 | An et al. |
| 2014/0359963 A1 | 12/2014 | An et al. |
| 2014/0373301 A1 | 12/2014 | Kim et al. |
| 2015/0026908 A1 | 1/2015 | Izabel et al. |
| 2015/0047141 A1 | 2/2015 | Houssat et al. |
| 2015/0059116 A1 | 3/2015 | An et al. |
| 2015/0074935 A1 | 3/2015 | An et al. |
| 2015/0089764 A1 | 4/2015 | Wu |
| 2015/0121644 A1 | 5/2015 | Young, III et al. |
| 2015/0135468 A1 | 5/2015 | Kim |
| 2015/0151718 A1 | 6/2015 | Moll |
| 2015/0158463 A1 | 6/2015 | Yi |
| 2015/0166016 A1 | 6/2015 | Wang |
| 2015/0246659 A1 | 9/2015 | Park |
| 2015/0251636 A1 | 9/2015 | Kim et al. |
| 2015/0251637 A1 | 9/2015 | Tolentino et al. |
| 2015/0258965 A1 | 9/2015 | An |
| 2015/0274130 A1 | 10/2015 | Tolentinto et al. |
| 2015/0274131 A1 | 10/2015 | Tolentinto et al. |
| 2015/0353054 A1 | 12/2015 | Tolentino et al. |
| 2016/0046263 A1 | 2/2016 | Tolentino et al. |
| 2016/0059828 A1 | 3/2016 | Tolentino et al. |
| 2016/0159323 A1 | 6/2016 | Tolentinto et al. |
| 2016/0280186 A1 | 9/2016 | Peers et al. |
| 2016/0375867 A1 | 12/2016 | Tolentino et al. |
| 2017/0057464 A1 | 3/2017 | Tolentinto et al. |
| 2017/0072912 A1 | 3/2017 | Tolentino et al. |
| 2017/0113656 A1 | 4/2017 | Tolentino |
| 2017/0334404 A1 | 11/2017 | Kawashima |
| 2017/0334406 A1 | 11/2017 | Kawashima |
| 2017/0334407 A1 | 11/2017 | Kawashima |
| 2017/0334769 A1 | 11/2017 | Luzzato et al. |

FOREIGN PATENT DOCUMENTS

| | | |
|---|---|---|
| DE | 4224866 B4 | 1/2007 |
| EP | 2781416 A1 | 9/2014 |
| WO | 2017/201458 A1 | 11/2017 |
| WO | 2017/201464 A1 | 11/2017 |
| WO | 2017/201470 A1 | 11/2017 |
| WO | 2017/201473 A1 | 11/2017 |
| WO | 2017/201485 A1 | 11/2017 |

OTHER PUBLICATIONS

"DuPont Wiper Blade Installation: Trapezoid Arm Style," Pylon Manufacturing Corp., dated Jan. 1, 2015, Retrieved from the Internet URL: http://http://windshield-wiperblades.com/resources?do=installation_removal&country=United%20States#, on Jul. 28, 2017, pp. 1-2.

"First Time Fit Wiper Blades: Top Lock 1 Connector Wiper Blade Installation Instructions" DENSO Auto Parts, Retrieved from the Internet URL: http://densoautoparts.com/wiper-blades-first-time-fit-wiper-blades.aspx#undefined, on Jul. 28, 2017, pp. 1-3.

Final Rejection towards U.S. Appl. No. 13/679,646 dated Jul. 14, 2017.

Office Action issued in connection with EP Application No. 12171721.9 dated Aug. 16, 2017.

Non-Final Rejection towards U.S. Appl. No. 14/715,144 dated Nov. 15, 2017.

International Search Report and Written Opinion issued in PCT Application No. PCT/US2017/033622 dated Aug. 11, 2017.

International Search Report and Written Opinion issued in PCT Application No. PCT/US2017/033629 dated Aug. 22, 2017.

International Search Report and Written Opinion issued in PCT Application No. PCT/US2017/033640 dated Aug. 23, 2017.

International Search Report and Written Opinion issued in PCT Application No. PCT/US2017/033657 dated Sep. 28, 2017.

International Search Report and Written Opinion issued in PCT Application No. PCT/US2017/033643 dated Oct. 2, 2017.

Forch, R., et al., "Appendix C: Contact Angle Goniometry," Surface Design: Applications in Bioscience and Nanotechnology, pp. 471-473 (Sep. 9, 2009).

International Search Report and Written Opinion issued in PCT Application No. PCT/US2017/059275 dated Jan. 25, 2018.

\* cited by examiner

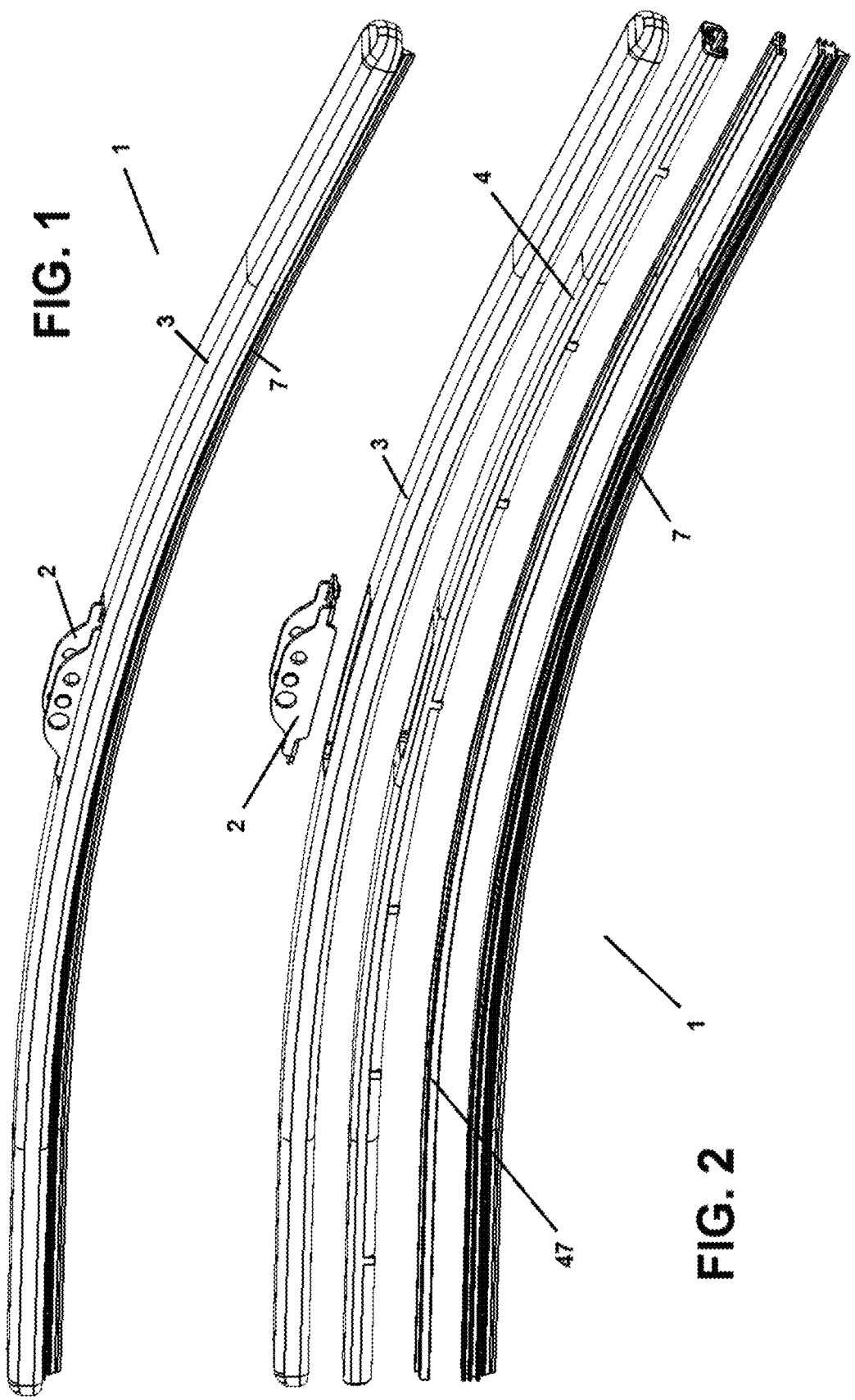

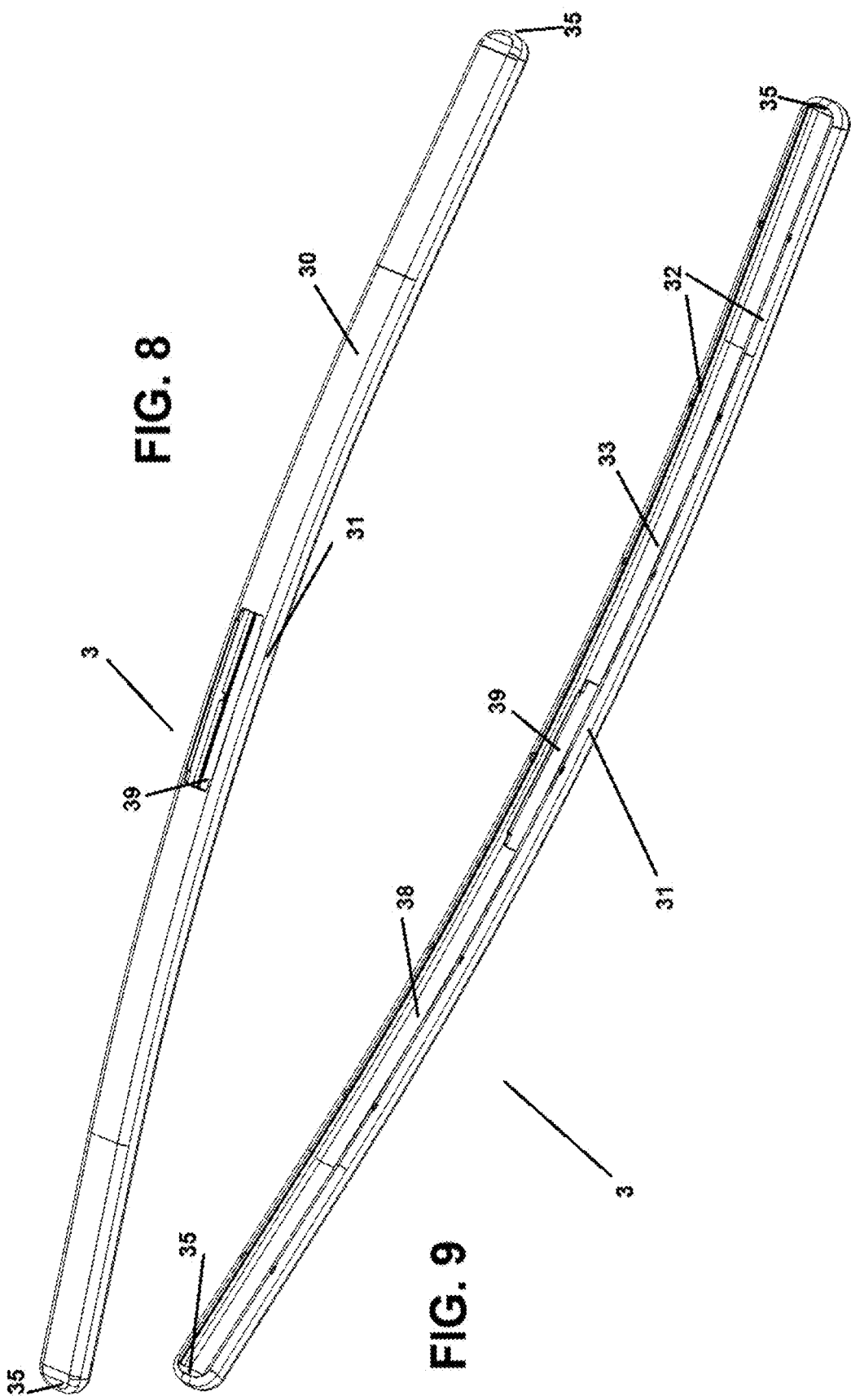

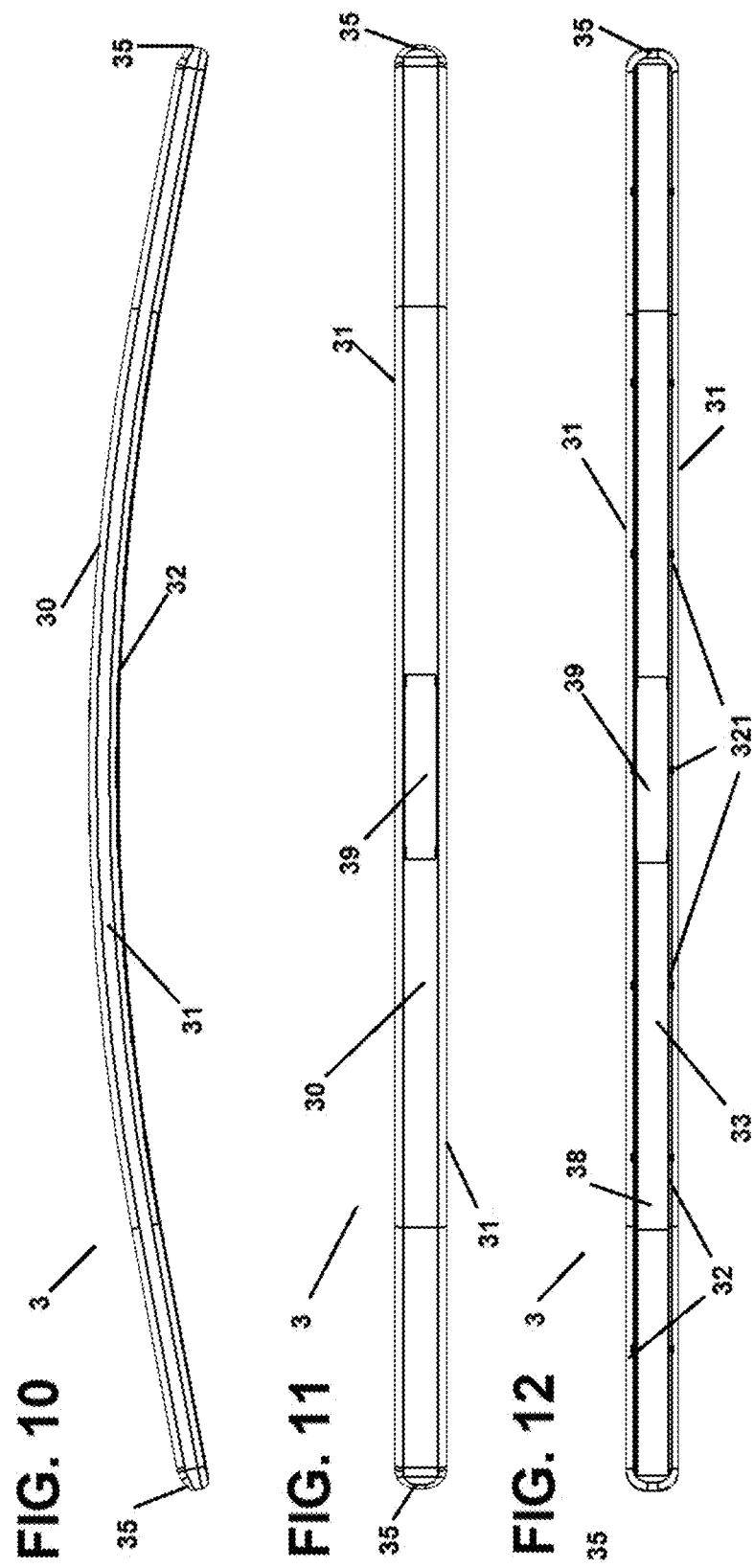

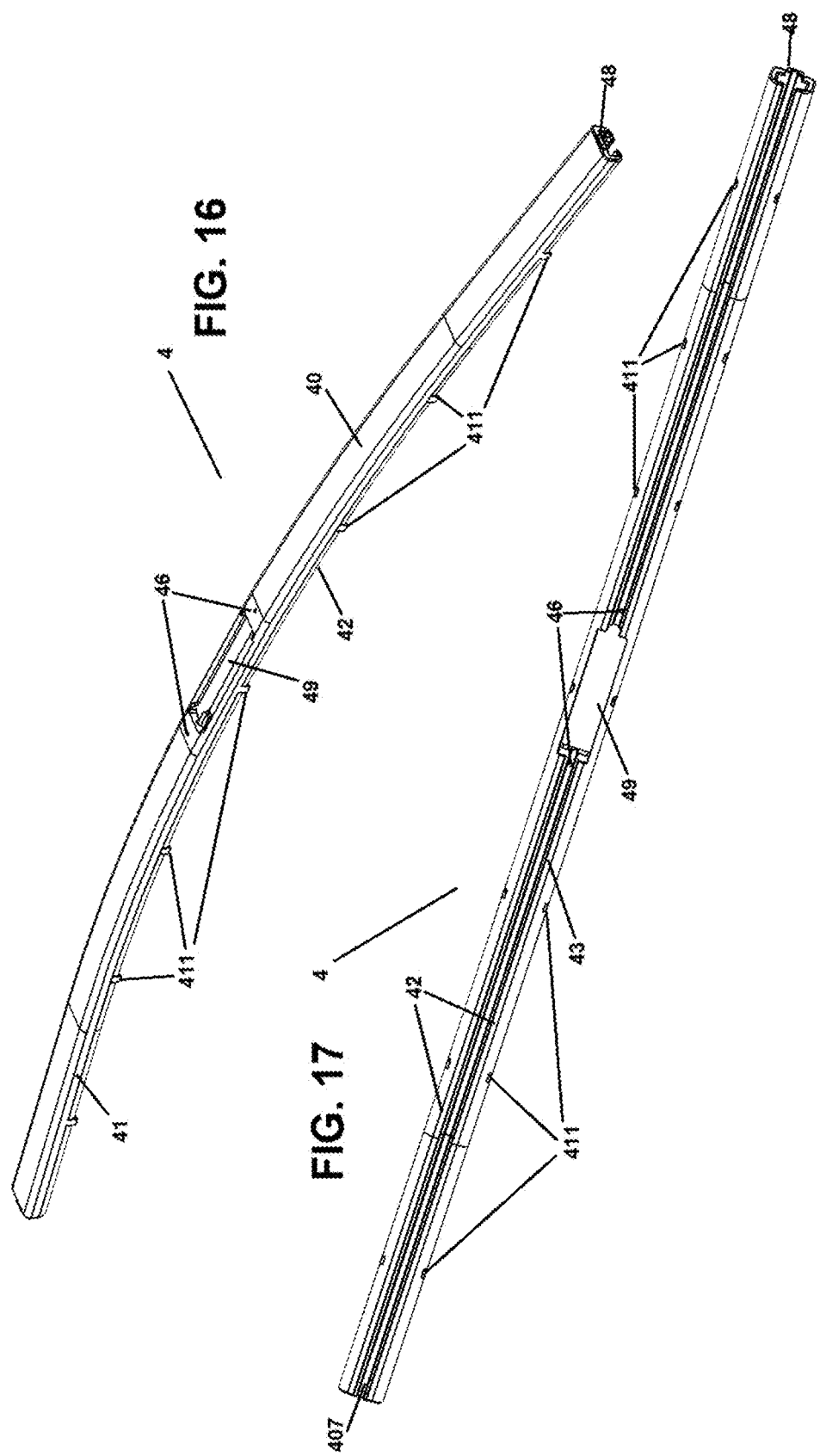

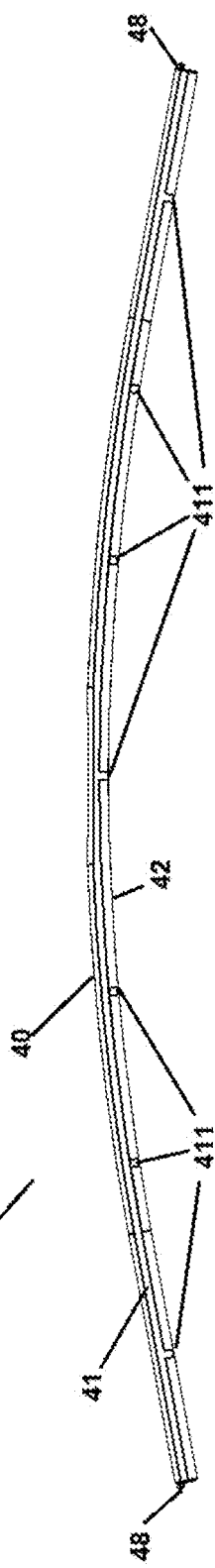
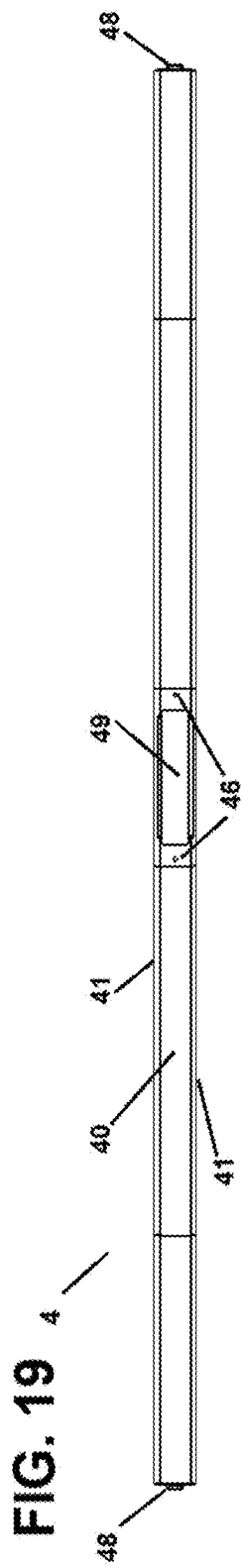
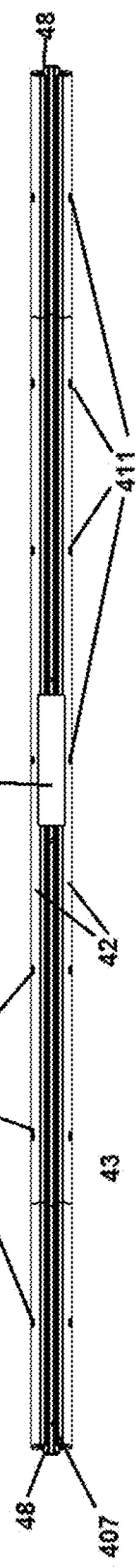

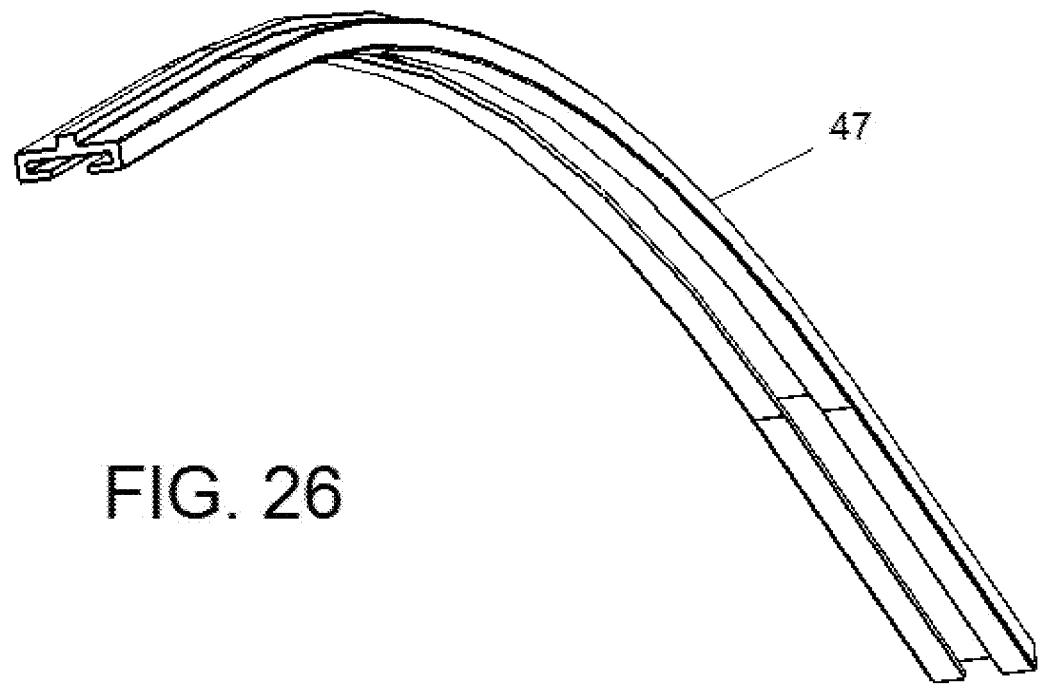
FIG. 26
FIG. 27
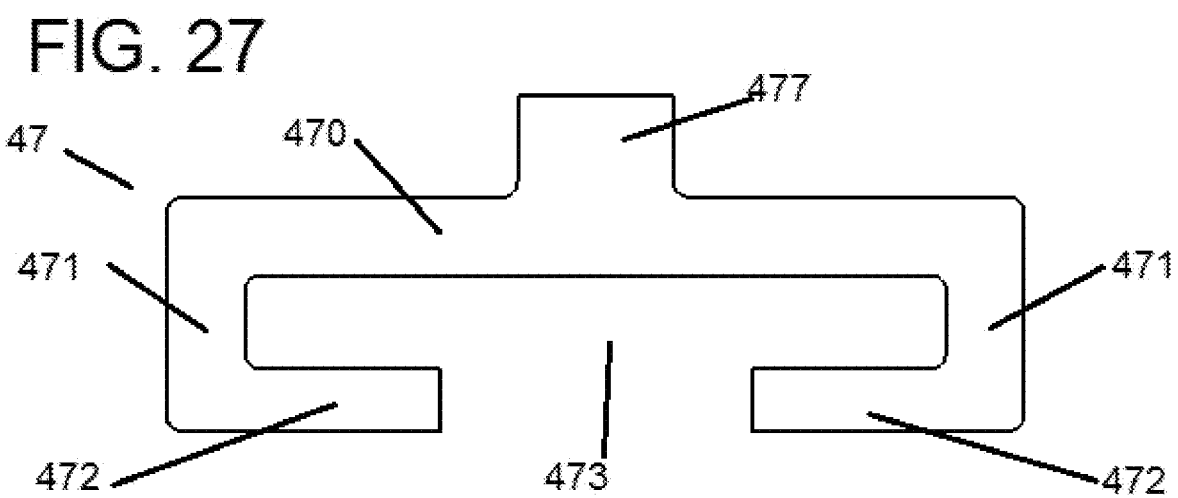

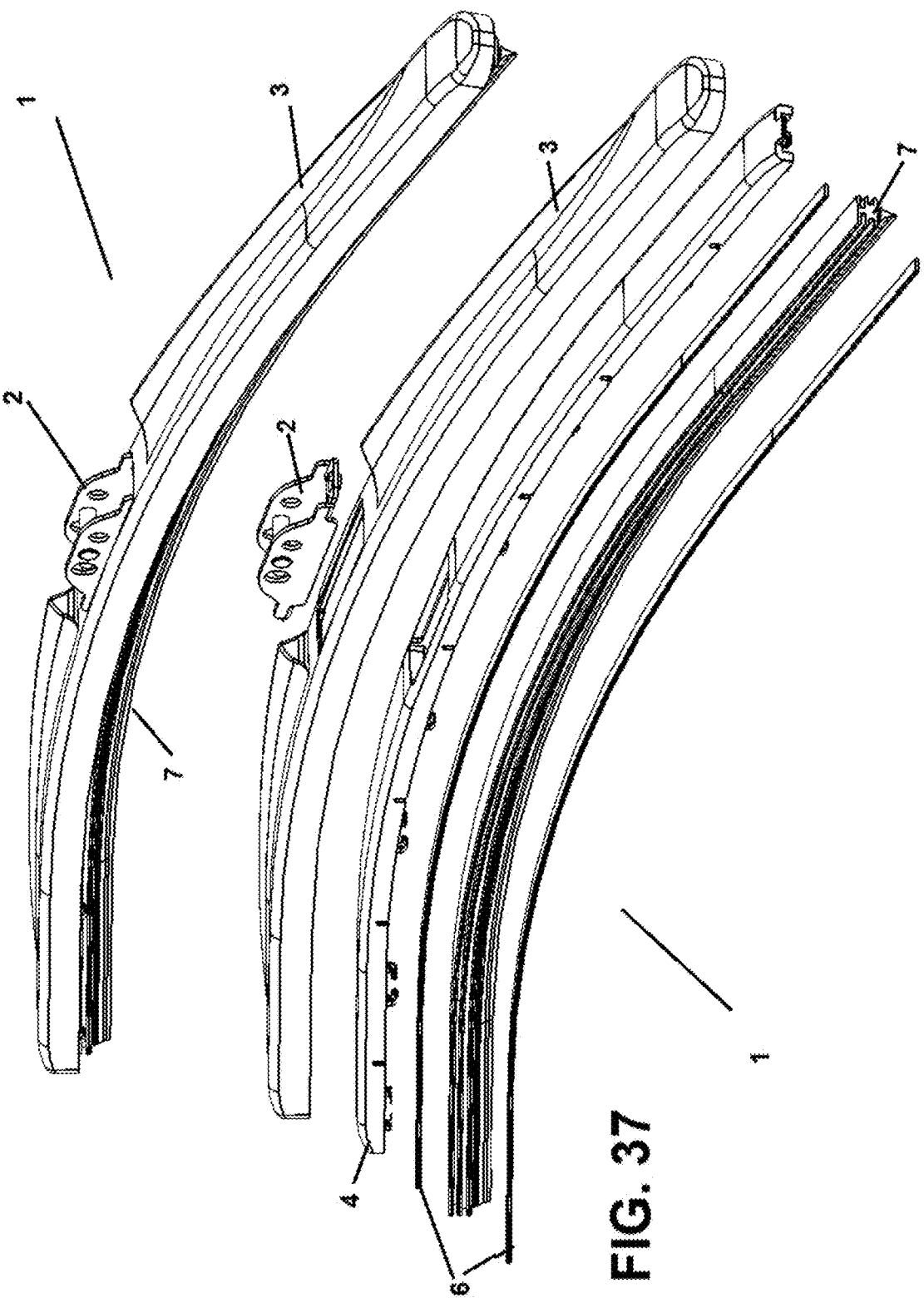

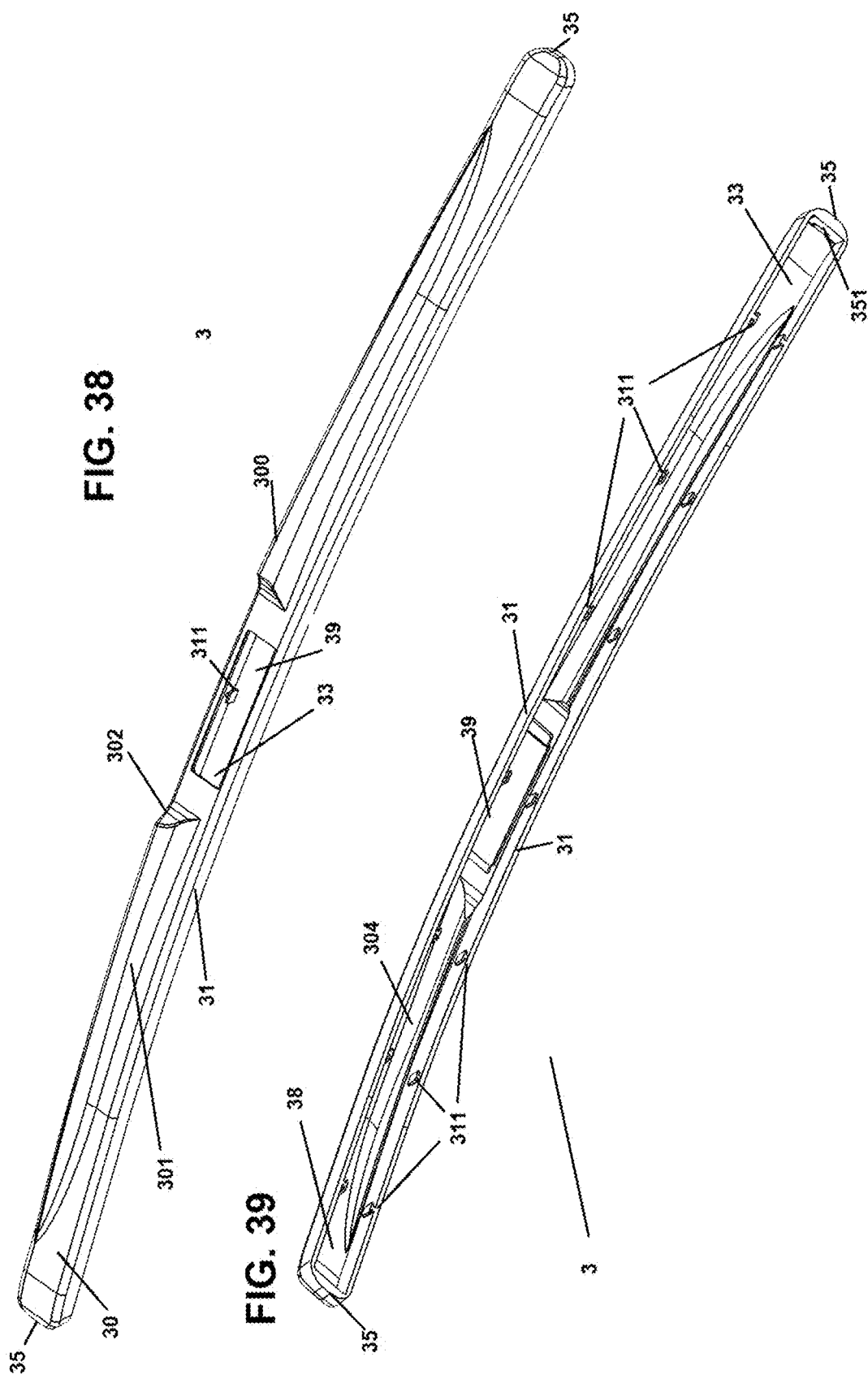

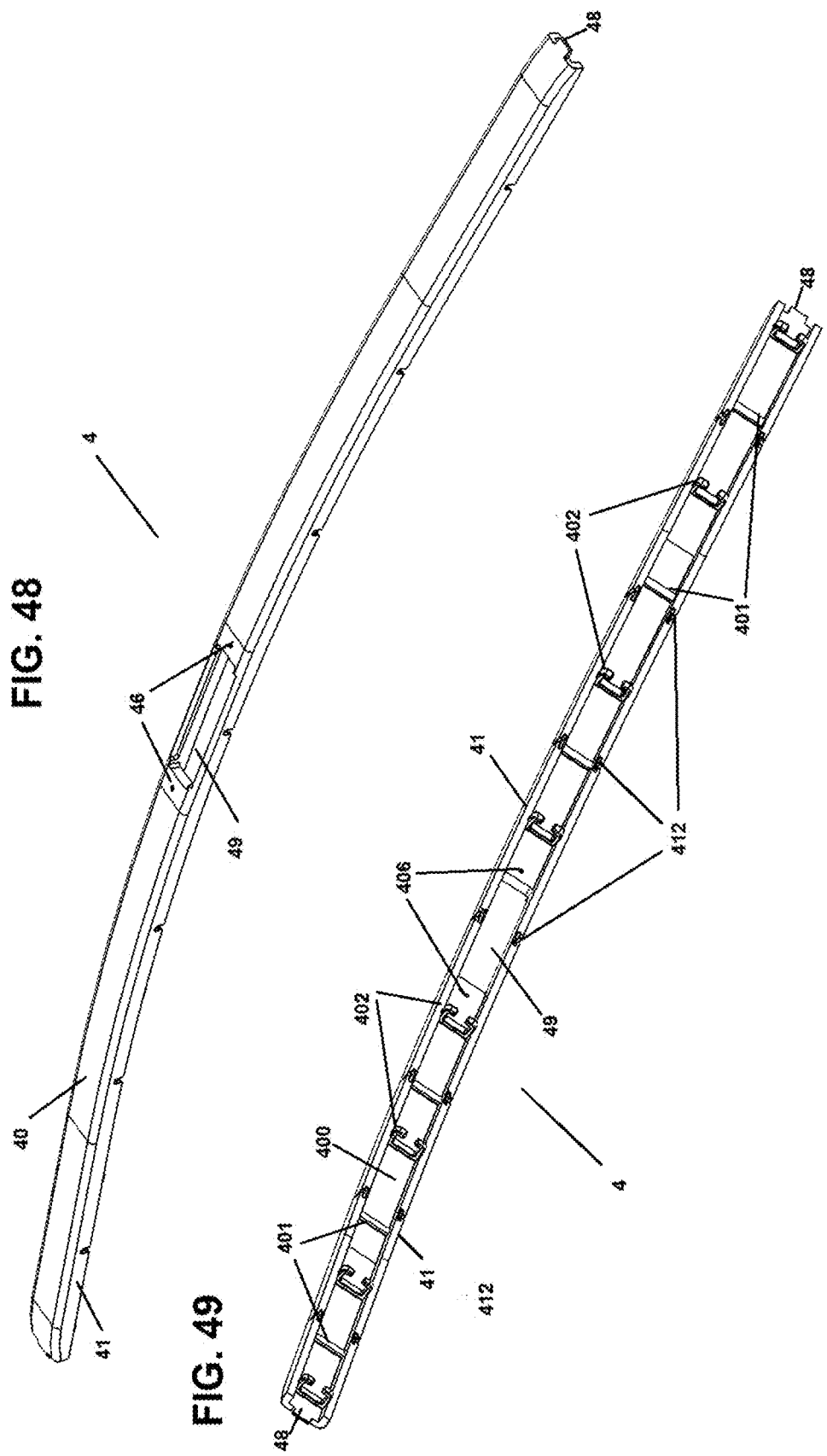

WINDSHIELD WIPER BLADE

CROSS REFERENCE TO RELATED APPLICATIONS

This application claims the benefit of U.S. Provisional Application No. 62/338,821 filed May 19, 2016 and U.S. Provisional Application No. 62/351,035 filed Jun. 16, 2016, the disclosures of which are hereby incorporated herein by reference in their entirety.

TECHNICAL FIELD

Aspects of the disclosure relate in general to windshield wipers, and more particularly, to a wiper blade including a backing element, a wiper strip, a mounting base and a cover.

BACKGROUND

There are a variety of different types of wiper blades currently used on vehicles. "Traditional" or "conventional" wiper blades have a series of brackets (also called yokes or frames) arranged in tournament-style, which distribute the force from the wiper arm down to the wiper strip. "Beam" wiper blades, or beam blades, use a spring-elastic metal beam (also called a support element) to distribute the force from the wiper arm to the wiper strip. "Hybrid" wiper blades use both a beam and brackets to distribute the force from the wiper arm to the wiper strip.

The disclosed concepts offer a new solution, using a backing element in place of a beam or traditional frames.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In certain embodiments, a wiper blade may include a wiper strip having a wide portion and a lip, and an elongate backing element. The backing element may have a top portion, and two opposing legs that descend from the top portion, such that each opposing leg has a claw which extends towards the other opposing leg. A gap may be formed between the claws that is narrower than a width of the wide portion of the wiper strip. The claws, legs, and top portion define a wiper strip cavity sized to receive the wide portion wiper strip.

In certain embodiments, a wiper blade may include a wiper strip having a wide portion and a lip, and an elongate backing element having a top portion, and two opposing legs that descend from the top portion. Each opposing leg may have a claw which extends towards the other opposing leg, such that a gap between the claws may be narrower than a width of the wide portion of the wiper strip. The claws, legs, and top portion may define a wiper strip cavity sized to receive the wide portion wiper strip. A mounting base having a base section that may be secured on the top portion of the backing element. A cover having a top surface from which two opposing legs descend, and having two end walls that may join the top surface and legs of the cover at respective ends of the cover. Each opposing leg of the cover may include a bottom claw extending towards the other opposing leg of the cover. The cover may be disposed on and cover the backing element. The cover may have a central recess that encircles the mounting base.

In certain embodiments, a wiper blade may include a wiper strip having a top strip, an elongate backing element having a top portion, and two opposing legs that descend from the top portion. The backing element may also have a first rib portion and a second rib portion extending between the opposing legs along a bottom surface of the top portion; wherein the first rib portion comprises opposed legs descending from the first rib portion, each opposing leg of the rib portion having a claw that extends towards the other opposing leg of the rib portion, such that the opposing legs and claws of the rib portion secure the wiper strip such that the top strip of the wiper strip is held against the first rib portion.

BRIEF DESCRIPTION OF THE DRAWINGS

The drawings set forth exemplary embodiments of the disclosed concepts, and are not intended to be limiting in any way.

FIG. 1 illustrates a perspective view of an embodiment of a wiper blade.

FIG. 2 illustrates a perspective view of an exploded rendition of the components of the wiper blade shown in FIG. 1.

FIG. 8 illustrates a perspective view from above of a cover of the wiper blade shown in FIG. 1.

FIG. 9 illustrates a perspective view from below of a cover of the wiper blade shown in FIG. 1.

FIG. 10 illustrates a front view of a cover of the wiper blade shown in FIG. 1.

FIG. 11 illustrates a top view of a cover of the wiper blade shown in FIG. 1.

FIG. 12 illustrates a bottom view of a cover of the wiper blade shown in FIG. 1.

FIG. 16 illustrates a perspective view from above of the backing element of the wiper blade shown in FIG. 1.

FIG. 17 illustrates a perspective view from below of the backing element of the wiper blade shown in FIG. 1.

FIG. 18 illustrates a front view of the backing element of the wiper blade shown in FIG. 1.

FIG. 19 illustrates a top view of the backing element of the wiper blade shown in FIG. 1.

FIG. 20 illustrates a bottom view of the backing element of the wiper blade shown in FIG. 1.

FIG. 26 illustrates a perspective view of the wiper strip sleeve of the wiper blade shown in FIG. 1.

FIG. 27 illustrates a cross-sectional profile of the wiper strip sleeve of the wiper blade shown in FIG. 1.

FIG. 36 illustrates a perspective view of an embodiment of a wiper blade.

FIG. 37 illustrates a perspective view of an exploded rendition of the components of the wiper blade shown in FIG. 36.

FIG. 38 illustrates a perspective view from above of the cover of the wiper blade shown in FIG. 36.

FIG. 39 illustrates a perspective view from below of the cover of the wiper blade shown in FIG. 36.

FIG. 48 illustrates a perspective view from above of the backing element of the wiper blade shown in FIG. 36.

FIG. 49 illustrates a perspective view from below of the backing element of the wiper blade shown in FIG. 36.

DETAILED DESCRIPTION OF THE ILLUSTRATIVE EMBODIMENT

Figure 3:
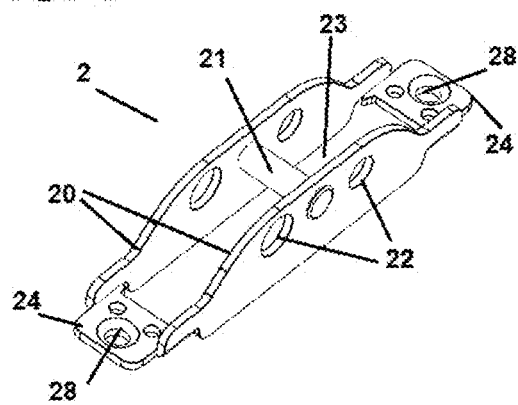
FIG. 3 illustrates a perspective view from above of the mounting base of the wiper blade shown in FIG. 1.
Figure 6:
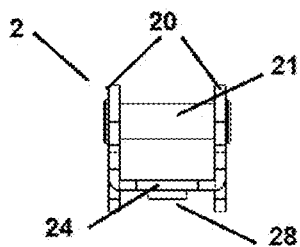
FIG. 6 illustrates a side view of the mounting base of the wiper blade shown in FIG. 1.
Figure 4:
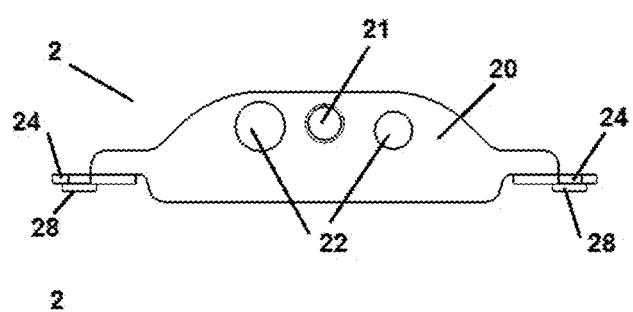
FIG. 4 illustrates a front view of the mounting base of the wiper blade shown in FIG. 1.
Figure 7:
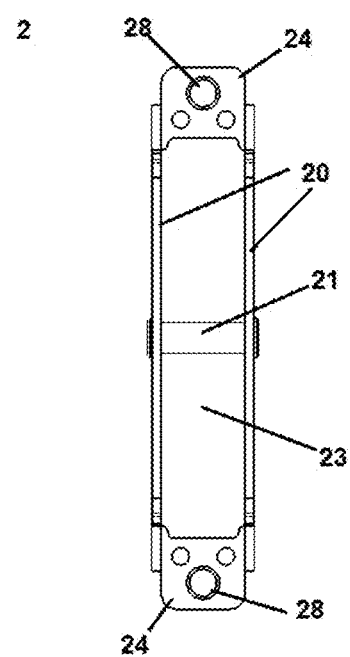
FIG. 7 illustrates a bottom view of the mounting base of the wiper blade shown in FIG. 1.
Figure 5:
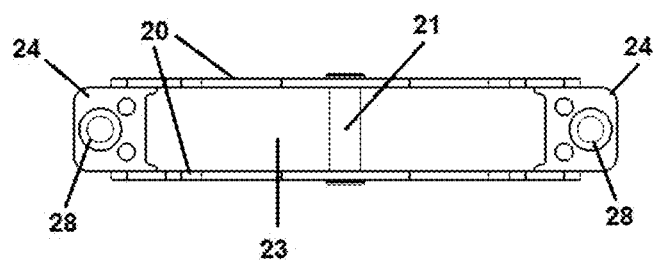
FIG. 5 illustrates a top view of the mounting base of the wiper blade shown in FIG. 1.
Figure 13:
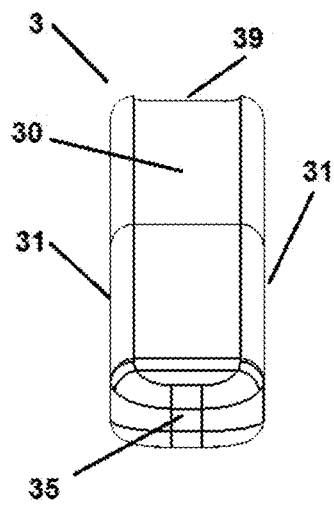
FIG. 13 illustrates a side view of a cover of the wiper blade shown in FIG. 1.
Figure 14:
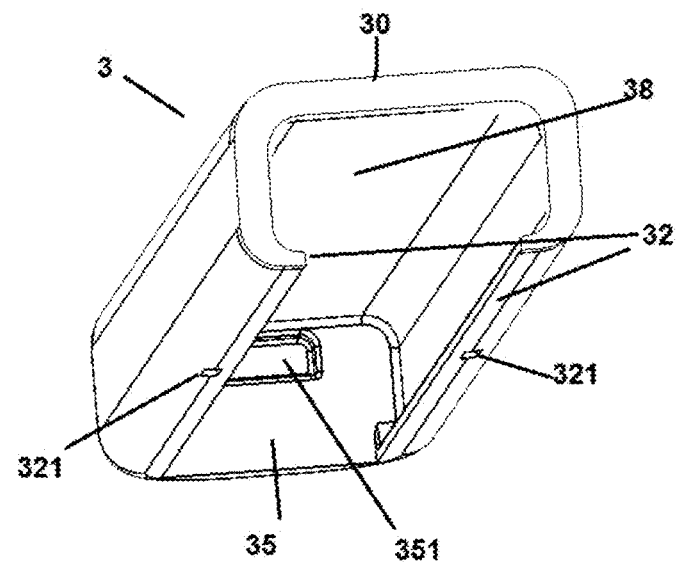
FIG. 14 illustrates a truncated perspective view of the end of a cover of the wiper blade shown in FIG. 1.
Figure 15:
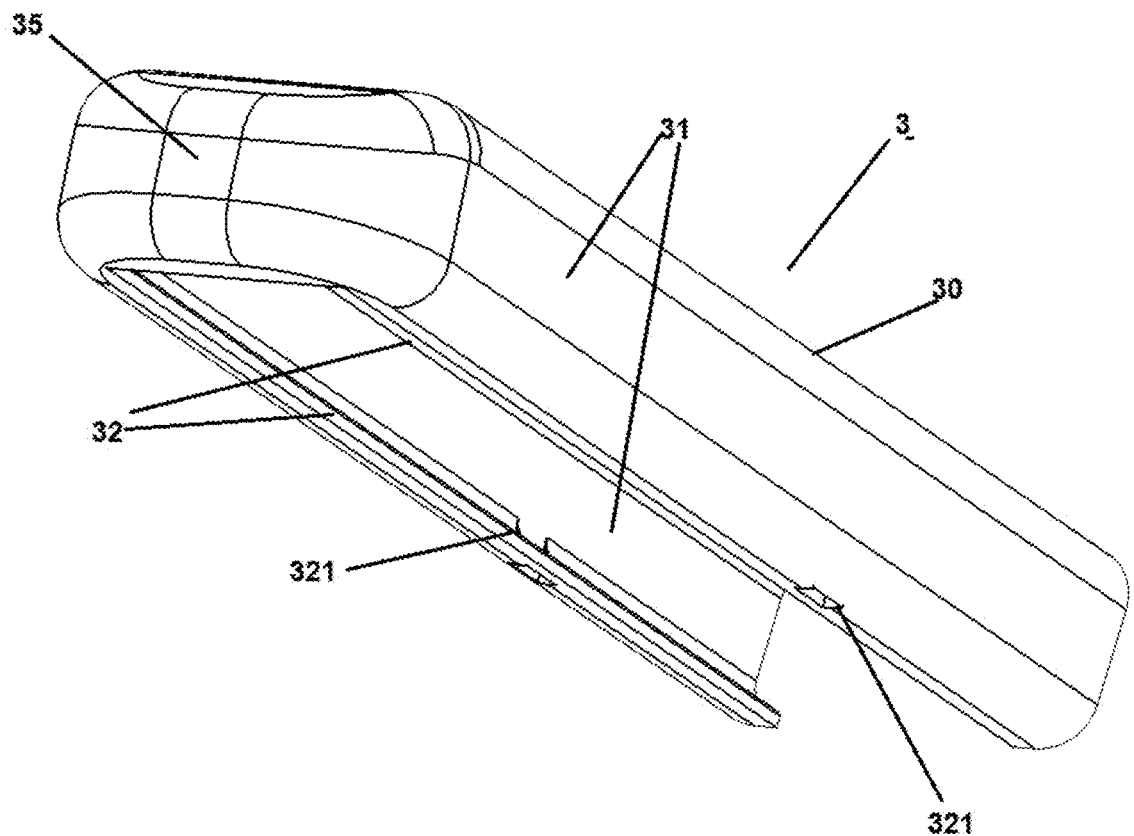
FIG. 15 illustrates a truncated perspective view of the end of a cover of the wiper blade shown in FIG. 1.
Figure 21:
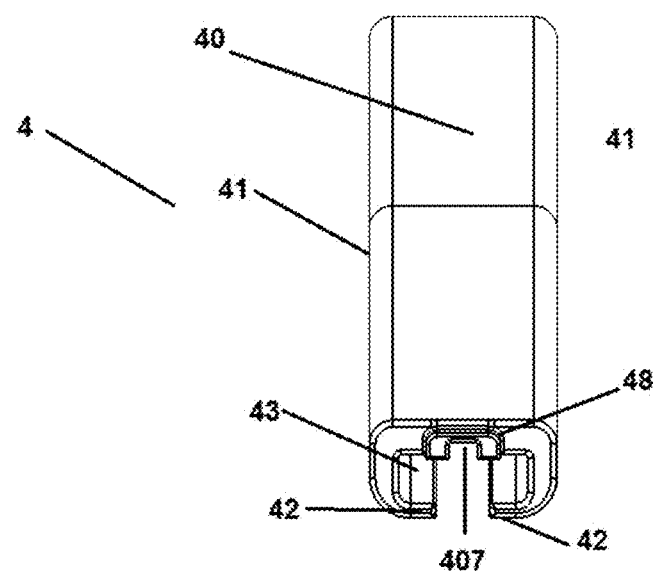
FIG. 21 illustrates a side view of the backing element of the wiper blade shown in FIG. 1.

The following detailed description and the appended drawings describe and illustrate exemplary embodiments solely for the purpose of enabling one of ordinary skill in the relevant art to make and use the invention. As such, the detailed description and illustration of these embodiments are purely exemplary in nature and are in no way intended to limit the scope of the invention, or its protection, in any manner. It should also be understood that the drawings are not to scale and in certain instances details have been omitted, which are not necessary for an understanding of the present invention, such as conventional details of fabrication and assembly.

In certain embodiments, a wiper blade may include an elongate wiper strip, an elongate backing element, a mounting base and a cover. The wiper strip may have a wiping lip, a wide portion, and an intermediate portion between the wiping lip and the wide portion such that the intermediate portion is narrower than the wide portion. The wiper blade may further include an elongate backing element having a top portion from which two opposing, elongate legs descend. Each leg may have an elongate claw that extends towards the opposite leg. The ends of the claws of the two legs may define a gap sized to receive the intermediate portion of the wiper strip. The mounting base may be capable of connecting the wiper blade to a wiper arm, and receiving a force from the wiper arm.

In certain embodiments, the backing element slideably engages the wiper strip directly, and the backing element may be pre-shaped and provide distribution of wiper arm force. In certain embodiments, the backing element may include claws along its length that slideably engage a wiper strip and one or more vertebrae. In certain other embodiments, a vertebra may be positioned between the backing element and the wiper strip. In certain embodiments, the backing strip and vertebra or vertebrae may work together to distribute the force from a wiper arm.

In certain embodiments, the backing element may slideably engage the wiper strip via a sleeve. The backing element may be elastic, and may have a section on which the mounting base is disposed, such that the mounting base is capable of applying a force from the wiper arm to the backing element, and the backing element is capable of distributing the force along the length of the wiper strip.

In certain embodiments, a cover may be provided that surrounds and covers the backing element.

In certain embodiments, a wiper blade may a wiper strip having a wide portion and a lip, and an elongate backing element. The backing element may have a top portion, and two opposing legs that descend from the top portion, such that each opposing leg has a claw which extends towards the other opposing leg. A gap may be formed between the claws that is narrower than a width of the wide portion of the wiper strip. The claws, legs, and top portion define a wiper strip cavity sized to receive the wide portion wiper strip.

In certain embodiments, the wiper blade may further have a wiper sleeve having a base from which two opposing legs descend, such that each leg of the wiper sleeve has a claw that extends towards the opposing leg of the wiper sleeve, such that the wiper sleeve base, legs and claws define a sleeve cavity that is sized to receive a top strip of the wiper strip. In certain embodiments, the sleeve may include a tongue on the top surface of its base, and the backing element may include an upper recess sized to receive the tongue.

In certain embodiments, the wiper strip may have an intermediate portion having a securing groove. The gap between the claws of the backing element may be sized to receive the intermediate portion the wiper strip by engaging the securing groove. In certain embodiments, the backing element may include at least one vertical projection extending downward from the legs. In certain such embodiments, the at least one vertical projection may extend even with, the bottom of the claws. In certain embodiments, the wiper blade may include a cover having at least one notch that engages the at least one vertical projection.

In certain embodiments, the wiper blade may include a cover having a top surface from which two opposing legs descend, and two end walls that join the top surface and legs of the cover at respective ends of the cover; wherein the cover is disposed on and covers the backing element. In certain embodiments, the backing element further may have a first end and a second end, each end having an end projection. The end walls of the cover further each may have a securing recess which receives one of the end projections of the backing element.

In certain embodiments, each opposing leg of the cover further comprises a bottom claw extending towards the opposing leg.

In certain embodiments, a mounting base having a base section may be secured on the top portion of the backing element. In certain embodiments, the backing element may have a central recess, such that the mounting base has a structure extending below the base portion and the central recess is sized and shaped to receive the structure. In certain embodiments, the mounting base may include two opposed vertical side walls extending above and below the base, wherein a rivet is disposed between the opposed vertical side walls, and wherein the structure comprises the portion of the vertical side walls extending below the base. In certain embodiments, a cover having a central recess that encircles the mounting base.

In certain embodiments, the base section of the mounting base may include at least one securing peg, and the top portion of the backing element comprises at least one securing hole, such that at least one securing hole receives and secures the at least one securing peg.

In certain embodiments, the wiper blade may include a cover having top surface that has a may have spoiler. In certain embodiments, the cover may have interior projections that engage complementary detents in the backing element. In certain embodiments, the interior projections are T-shaped.

In certain embodiments, a wiper blade may include a wiper strip having a wide portion and a lip, and an elongate backing element having a top portion, and two opposing legs that descend from the top portion. Each opposing leg may have a claw which extends towards the other opposing leg, such that a gap between the claws may be narrower than a width of the wide portion of the wiper strip. The claws, legs, and top portion may define a wiper strip cavity sized to receive the wide portion wiper strip. A mounting base having a base section that may be secured on the top portion of the backing element. A cover having a top surface from which two opposing legs descend, and having two end walls that may join the top surface and legs of the cover at respective ends of the cover. Each opposing leg of the cover may include a bottom claw extending towards the other opposing leg of the cover. The cover may be disposed on and cover the backing element. The cover may have a central recess that encircles the mounting base.

In certain embodiments, a wiper blade may include a wiper strip having a top strip, an elongate backing element having a top portion, and two opposing legs that descend from the top portion. The backing element may also have a first rib portion and a second rib portion extending between the opposing legs along a bottom surface of the top portion; wherein the first rib portion comprises opposed legs descending from the first rib portion, each opposing leg of the rib portion having a claw that extends towards the other opposing leg of the rib portion, such that the opposing legs and claws of the rib portion secure the wiper strip such that the top strip of the wiper strip is held against the first rib portion.

Figure 35:
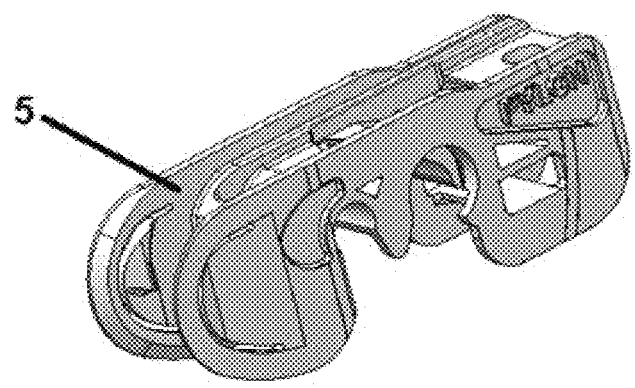
FIG. 35 illustrates an example connector that may be used with the wiper blade shown in Figure.
Figure 40:
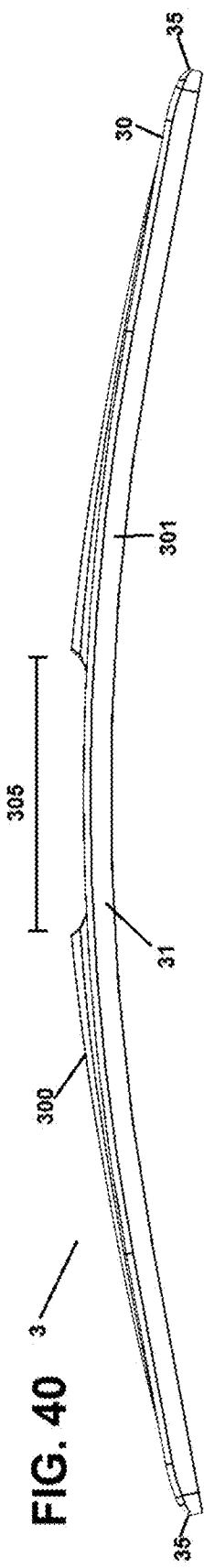
FIG. 40 illustrates a front view of the cover of the wiper blade shown in FIG. 36.

FIGS. 1-2 illustrate a wiper blade 1 which may have a mounting base 2, a cover 3, a backing element 4, vertebrae 6, and a wiper strip 7. The mounting base 2 may be configured to connect to a wiper arm through the use of a connector 5 or an adapter. One possible connector 5 which may be used in accordance with the disclosed concepts is depicted in FIG. 35. Such a connector is described in U.S. Pat. No. 6,680,340, which is incorporated herein by reference in its entirety. Any other suitable connectors or adapters known in the art may also be used with the disclosed concepts, including the connectors described in U.S. Pat. Nos. 8,806,700 and 9,108,595, and U.S. Publication Nos. 2013/0185889, 2013/0192015, 2014/0283325 and 2015/0251637, which are each incorporated herein by reference in their entireties. Persons of skill in the art will also recognize that the mounting base may be specifically adapted to connect to a particular type of wiper arm directly without the use of a connector or an adapter, including the mounting base designs disclosed in U.S. Publication No. 2014/0082875, which is incorporated herein by reference in its entirety. Similarly, persons of skill in the art will recognize that the cover depicted in FIGS. 1 and 2 is exemplary, and that any suitable cover, including covers with a spoiler as shown in FIGS. 36-47, may also be used in accordance with the disclosed concepts, including covers having spoilers with constant height and shape, covers having decreasing height, spoilers forming a centered isosceles triangle, or an off-center spoiler (as shown in FIG. 47), including covers as described in U.S. Patent Publication Nos. 2012/0266405 and 2013/0205532, which are incorporated herein by reference in their entirety. Additionally, persons of ordinary skill in the art will recognize that any suitable wiper strip known in the art may be used in accordance with the disclosed concepts, including the wiper strips described in U.S. Provisional Application Ser. No. 62/139,383, which is incorporated herein by reference in its entirety.

One exemplary mounting base 2 that may be use in accordance with the disclosed concepts is illustrated in FIGS. 2-7. The mounting base is preferably made of steel, though any other suitable material or combination of materials known in the art, including other metals, plastics, rubber, and resins, may also be used. Persons of skill in the art will recognize that any known mounting base may be used with the disclosed concepts, and such mounting bases may be implemented in many different ways, and different design choices may be made with respect to materials for all components, including the mounting base.

The mounting base 2 may have two or more cavity side walls 20 defining a cavity 23 therebetween. As Shown in FIG. 3, two of the sidewalls 20 may extend in the longitudinal direction of the wiper blade 1, and a rivet 21 may extend and be secured between same. The mounting base may further have one or more pin holes 22 to allow the pin of a pin-type wiper arm to pass through and be secured, by a connector 5 or otherwise. The mounting base may have a base section 24 between and joining the side walls 20. As also shown in those FIGS. 3-7 securing pegs 28 may be disposed on the base section 24. The securing pegs 28 may engage a securing hole 46 or recess in the backing element 4 or in the cover (not shown) via a snap fit, friction fit, or other form fitting connection. The top surface of the backing element 4 may also have a central opening 49, which receives any portions of the mounting base 2 which extend below the base sections 24. Persons of skill in the art will recognize that securing mechanism may be swapped, having the securing holes located in the mounting base 2, and the securing pegs located in the cover/backing element. Persons of skill in the art will also recognize that any other suitable securing mechanism known in the art may be used, including detents and recesses, dovetails, opposed projections, and other such structures may be used. Persons of skill in the art will also recognize that the securing mechanism need not be on the top surface of the projecting extension, but may be on the side, or may extend from the side of the shoulder, or any other arrangement known in the art.

FIGS. 8-15 illustrate an exemplary cover 3 in accordance with the disclosed concepts. The cover may be a single, unitary piece, as shown in FIGS. 8-13, or the cover may be made from separate cover sections which may connect to each other or to the mounting base 2. The cover 3 is preferably made of soft, elastic plastic or rubber, though any other suitable material or combination of materials known in the art, such as resins and silicon, for instance, may be used. In some embodiments the cover, or portions thereof may be made from a material having a Shore Hardness A of 70±5 or less. In other embodiments, the cover, or portions thereof may be made from a material having a Shore Hardness A of 60±5 or less. In other embodiments, the cover may be made from multiple materials, or having multiple hardnesses. It may be advantageous to have some portions of the cover, such as the claws made from a harder material, such as one having a Shore Hardness A of 85±5 or greater, or one having a Shore Hardness A of 95±5 or greater. For example, in one such embodiment, the hardness of the claws 32 may be greater than the hardness of the other parts of the cover 3. For example, the claws 32 may be made from hard plastic, while the other portions of the cover 3 may be made from a softer plastic or rubber. Persons of skill in the art will recognize that disclosed concepts may be implemented in many different ways, and different design choices may be made with respect to materials for all components, including the cover.

The cover 3 may include a top surface 30. As discussed above, any suitable cover known in the art may be used, with or without a spoiler. As shown in FIGS. 8-15, the cover 3 may have a top surface 30, from which two legs 31 may descend, and end walls 35 joining the top surface and legs of the cover at respective ends of the cover 3. The end wall may have a securing recess 351, which may receive and secure an end projection 48 on the backing element 4. Each leg may have a bottom claw 32 which may help to secure the backing element 4. In certain embodiments, as shown in FIGS. 8-15, the claws may have securing notches or recesses 321 formed along the length of the claws 32. These notches 321 may receive and secure vertical projections 411 on the backing element 4 via a snap fit, friction fit, or other form fitting connection. Persons of skill in the art will recognize that securing mechanism may be swapped, having the notches located in the backing element 2, and the projections located in the cover. Persons of skill in the art will also recognize that any other suitable securing mechanism known in the art may be used, including detents and recesses, dovetails, opposed projections, and other such structures may be used. Persons of skill in the art will also recognize that the securing mechanism need not be on the top surface of the projecting extension, but may be on the side, or may extend from the side of the shoulder, or any other arrangement known in the art. The cover 3 may further have a central opening 39 which may encircle and/or secure the mounting base 2.

FIGS. 16-24 illustrate an exemplary backing element 4 in accordance with the disclosed concepts. The backing element 4 is preferably made of hard or resilient, sprint-elastic plastic, though any other suitable material or combination of materials known in the art, including metals, rubber, and resins, for example, may be used. In some embodiments the backing element 4, or portions thereof may be made from a material having a Shore Hardness A of 85±5 or greater. In some embodiments the backing element 4, or portions thereof may be made from a material having a Shore Hardness A of 95±5 or greater. In other embodiments, the backing element 4 may be made from multiple materials, or having multiple hardnesses. Persons of skill in the art will recognize that disclosed concepts may be implemented in many different ways, and different design choices may be made with respect to materials for all components, including the mounting base. The backing element may connect to the mounting base 2, which in turn is capable of connecting to a wiper arm directly or through the use of a connector 5 or adapter. The backing element 5, alone or with the help of the vertebrae distribute the force received from the wiper arm along the length of the wiper strip 7.

Figure 22:
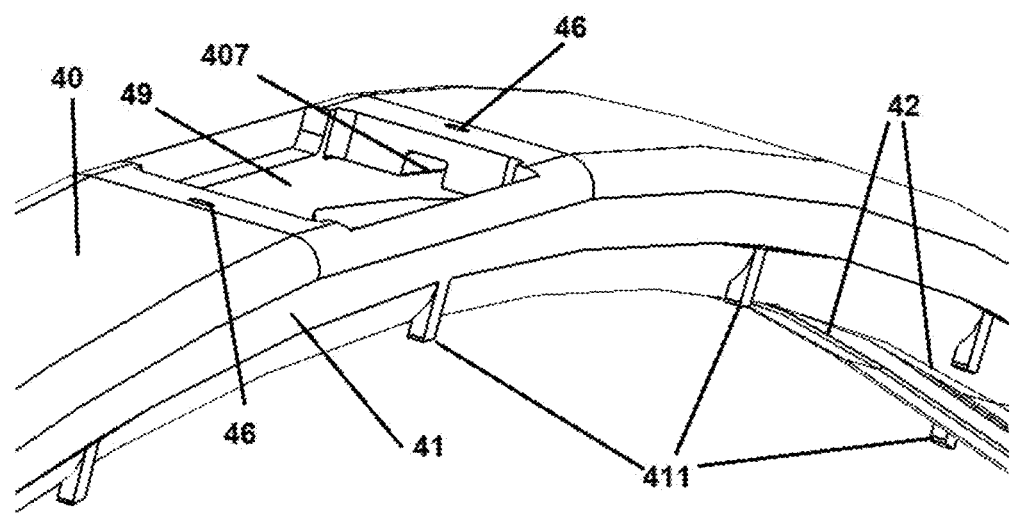
FIG. 22 illustrates a perspective view of the front center portion of the wiper blade shown in FIG. 1.
Figure 23:
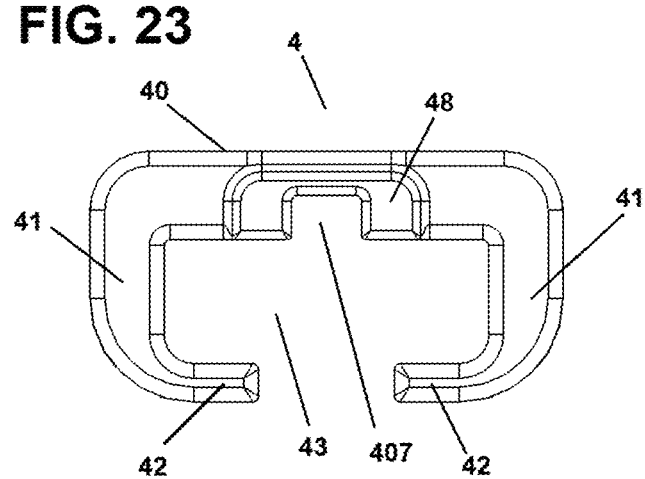
FIG. 23 illustrates a side view of an end of the backing element of the wiper blade shown in FIG. 1.
Figure 25:
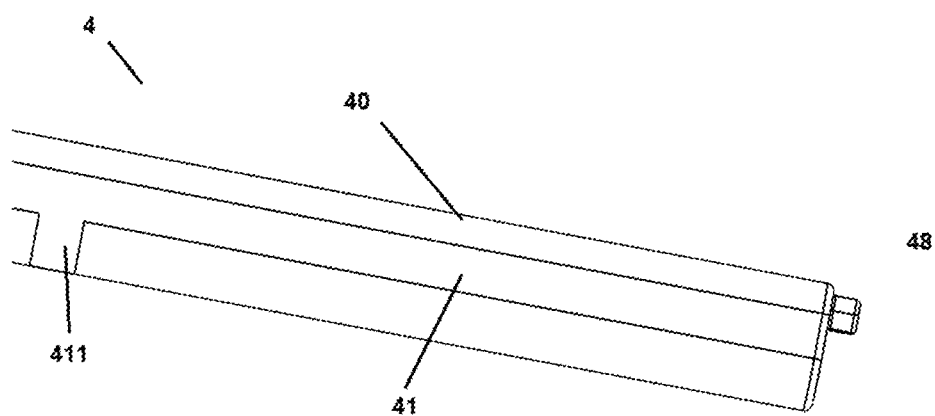
FIG. 25 illustrates a side view of the end portion of the backing element of the wiper blade shown in FIG. 1

The elongate backing element 4 may have a top portion 40, from which two opposing legs 41 descend. Each opposing leg may have a claw 42 which extends towards the opposing leg. The claws 42, legs 41, and top portion 40 may define a wiper strip cavity 43 sized to receive the wide portion 75 of a wiper strip 7 and/or a wiper sleeve 47. Similarly, the opposing claws 42 may define a gap therebetween sized to receive the intermediate portion 73 of a wiper strip 7—which may be narrower than the wide portion 75 of the wiper strip 7—by engaging a recess or securing groove 76 (these terms may be used interchangeably) adjacent to the intermediate portion 73. The backing element 4 may also have vertical projections 411 extending from the legs 41. As shown in FIGS. 22 and 25, these vertical projections 411 may project downwards from the legs, to extend even with, or just past, the bottom of the claws 42. As discussed above, these vertical projections 411 may engage the notches or recesses 321 in the cover 3, and may be secured by same.

The top portion 40 of the backing element 4 may also have an upper recess 407. The upper recess 47 may be sized to receive and secure a tongue 477 from a wiper strip sleeve 47. As discussed above, the backing element 4 may have a central opening 49 to receive portions of the mounting base which extend below the base section 24, and securing holes 46 to receive and engage securing pegs 28 in the mounting base 2. As also discussed above, the backing element 4 may also have other securing structures, including pegs, projections, detents, recesses, holes, shoulders, and any other suitable structure known in the art in order to engage and secure a complementary structure in the mounting base 2 or cover 3.

Figure 24:
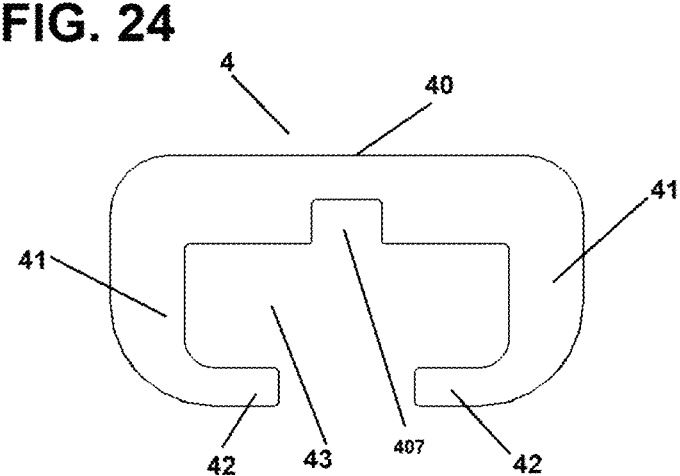
FIG. 24 illustrates a cross-sectional profile of the backing element of the wiper blade shown in FIG. 1.

As shown in FIGS. 17, 24 and 25, the ends of the backing element 4 may be provided with end projections 48 which engage end securing recess 351 in the end walls 35 of the cover. Persons of skill in the art will recognize that the securing structures may be swapped, such that the end wall 35 of the cover 3 have securing projections received by end recesses in the ends of the backing element 4, and that any other suitable securing mechanism known in the art may be used, including detents and recesses, dovetails, opposed projections, and other such structures may be used.

FIGS. 26 and 27 illustrate an exemplary embodiment of a wiper strip sleeve 47. The wiper strip sleeve 47 comprises a base 470 from which two opposing legs 471 may descend. Each leg 471 may further have a claw 472 extending inwardly perpendicular to the leg 471. The sleeve cavity 473 may be sized to receive a top strip 70 of a top portion 75 of a wiper strip 7. Further, the claws 472 extending inwardly towards each opposing leg 471 may engage a groove 74 of a wiper strip 7 such that the top strip 70 is seated within the sleeve cavity 473. Also, the lower claws 42 of the backing element 4 may each engage a securing groove 76 in the wiper strip 7. Further, in some embodiments, the opposing lower claws 42 may define a gap therebetween sized to receive the intermediate portion of 73 of a wiper strip 7, and may secure the intermediate portion 73 by engaging a recess or securing groove 76 (these terms may be used interchangeably) adjacent to the intermediate portion 73. In some embodiments, the base 470 of the wiper strip sleeve 47 may have a tongue 477 that may be sized to engage the upper recess 407 of the backing element 4.

Figure 28:
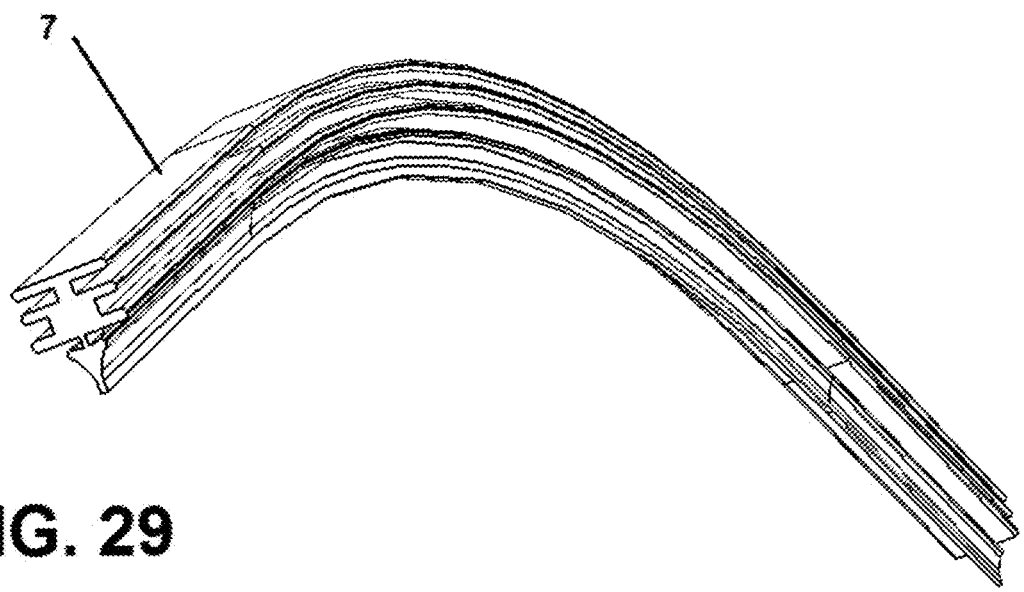
FIG. 28 illustrates a perspective view of the wiper strip of the wiper blade shown in FIG. 1.
Figure 29:
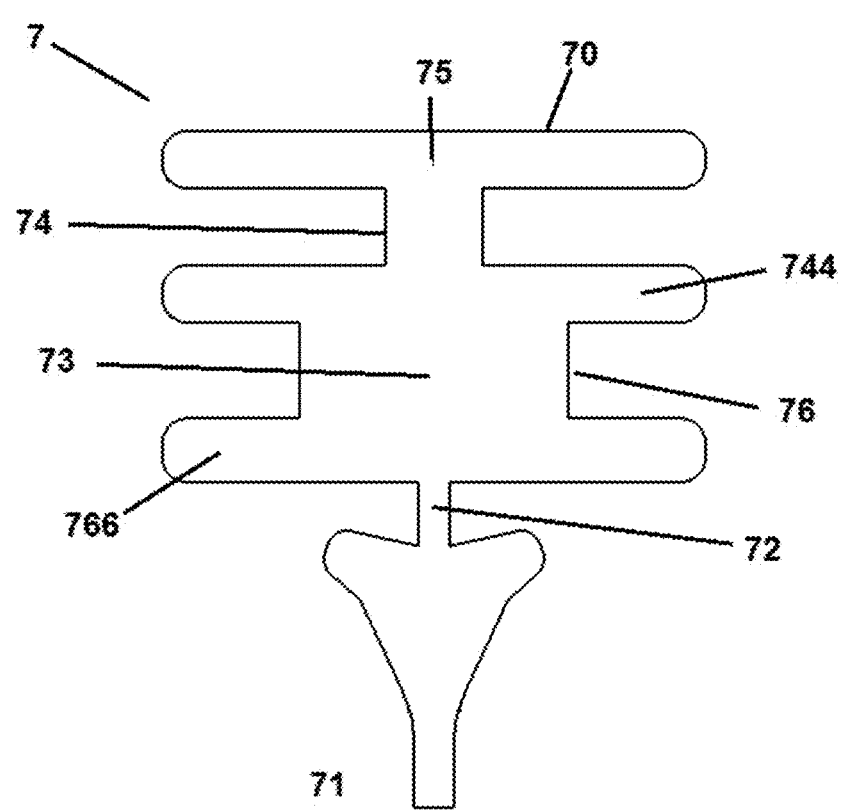
FIG. 29 illustrates a cross-sectional profile of the wiper strip of the wiper blade shown in FIG. 1.

FIGS. 28 and 29 illustrate an exemplary wiper strip 7 that may be used in accordance with the disclosed concepts. The wiper strip is preferably made of a soft rubber or plastic, but may be made of any suitable material. The wiper strip may have a top portion 75 having a top strip 70 from which an intermediate portion 73 descends. The top portion 75 may have one or more grooves 74 which may house the claws 472 of a wiper strip sleeve 47, or may alternatively house vertebrae or flexors 6 (these terms may be used interchangeably). The intermediate portion may be sized to fit between the claws 42 of the backing element 4, and may have a recessed portion or securing groove 76 which is sized to receive the claws 42. In some embodiments, as shown in FIG. 28, the groove 74 above the intermediate portion 73 and below the top strip 70, may be formed between the top strip 70 and intermediate arms 744 of a wiper strip 7. Similarly, the se ring groove 76 of the wiper strip 7 may be formed adjacent the intermediate portion 73 between the intermediate arms 744 and the bottom arms 766 of a wiper strip. Persons of skill in the art will recognize that any suitable wiper strip may be used in accordance with the disclosed concepts.

Figure 30:
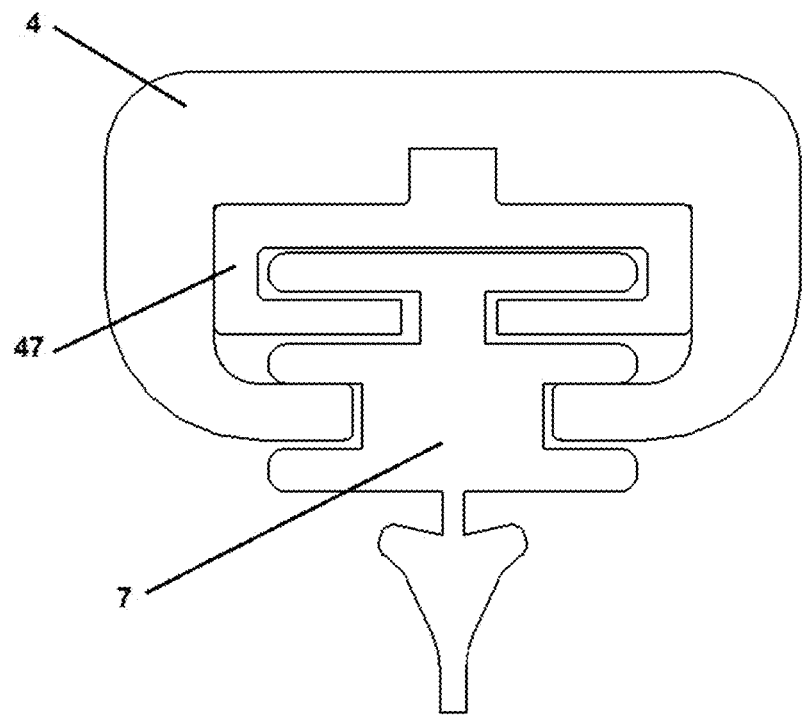
FIG. 30 illustrates a cross-sectional view of the backing element, wiper strip sleeve and wiper strip of the wiper blade shown in FIG. 1.
Figure 31:
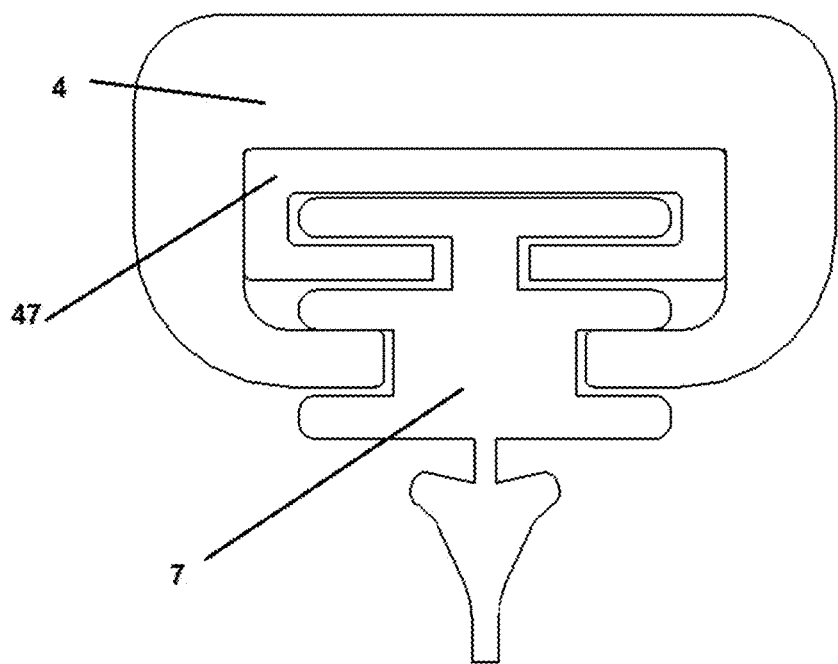
FIG. 31 illustrates a cross-sectional view e backing element, wiper strip sleeve and wiper strip of an alternative embodiment.

FIG. 30 illustrates the combined wiper strip 7, wiper strip sleeve 47, and backing element 4, secured to one another as described above. However, persons of ordinary skill in the art will recognize that alternative methods of securing these elements to one another are possible. For example, FIG. 31 illustrates an alternative embodiment of the disclosed concepts wherein the wiper strip sleeve 47 does not feature a tongue 477, and the top portion 40 of the backing element 4 does not feature an upper recess 407.

Figure 32:
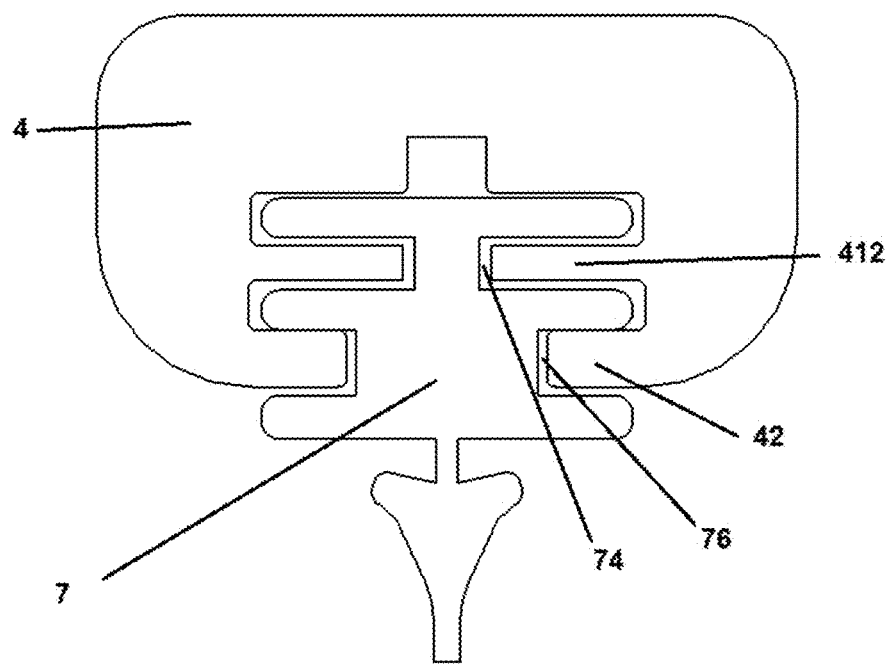
FIG. 32 illustrates a cross-sectional view of the backing element and wiper strip of an alternative embodiment.

Similarly, FIG. 32 illustrates an alternative embodiment of the disclosed concepts' backing element 4 that secures a wiper strip 7 directly without using a wiper strip sleeve. As shown in FIG. 32, backing element 4 may include an inner rail 412 which may engage the groove 74 of the wiper strip, while the claws 42 engage the securing groove 76 of the wiper strip 7.

Figure 33:
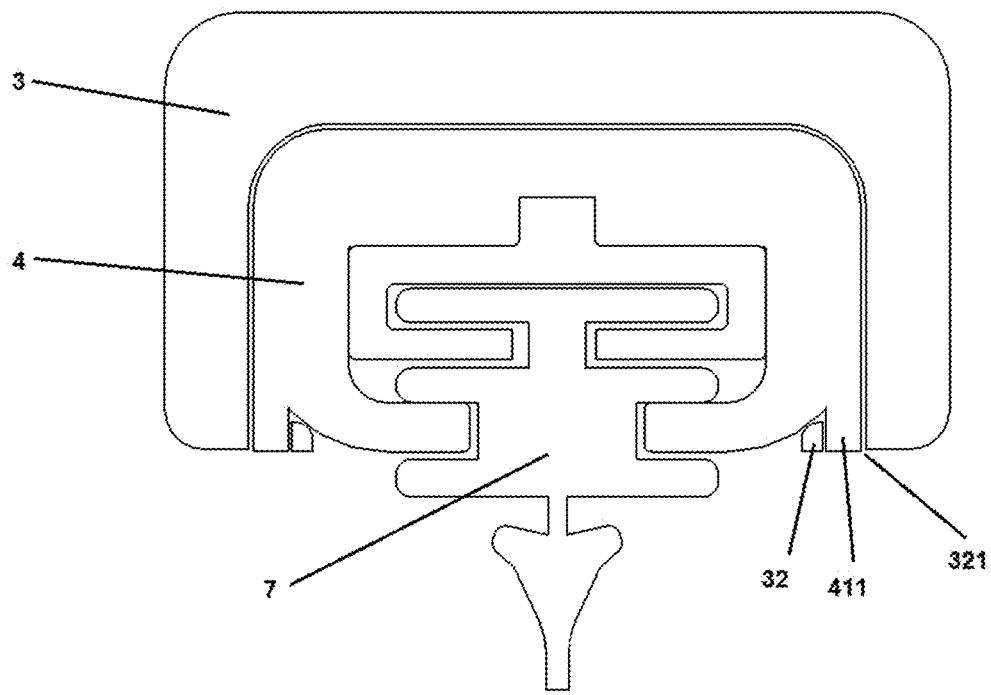
FIG. 33 illustrates a cross-sectional view of the cover, backing element, wiper strip sleeve and wiper strip of the wiper blade shown in FIG. 1.

Similarly, persons of ordinary skill in the art will recognize that the cover 3 may be secured to the backing element 4 in any suitable manner known in the art. FIG. 33 illustrates the manner in which the vertical projections 411 on the backing element 4 engage the notches 321 on the claws 32 of the cover 3 in order to secure the cover 3 to the backing element 4.

Figure 34:
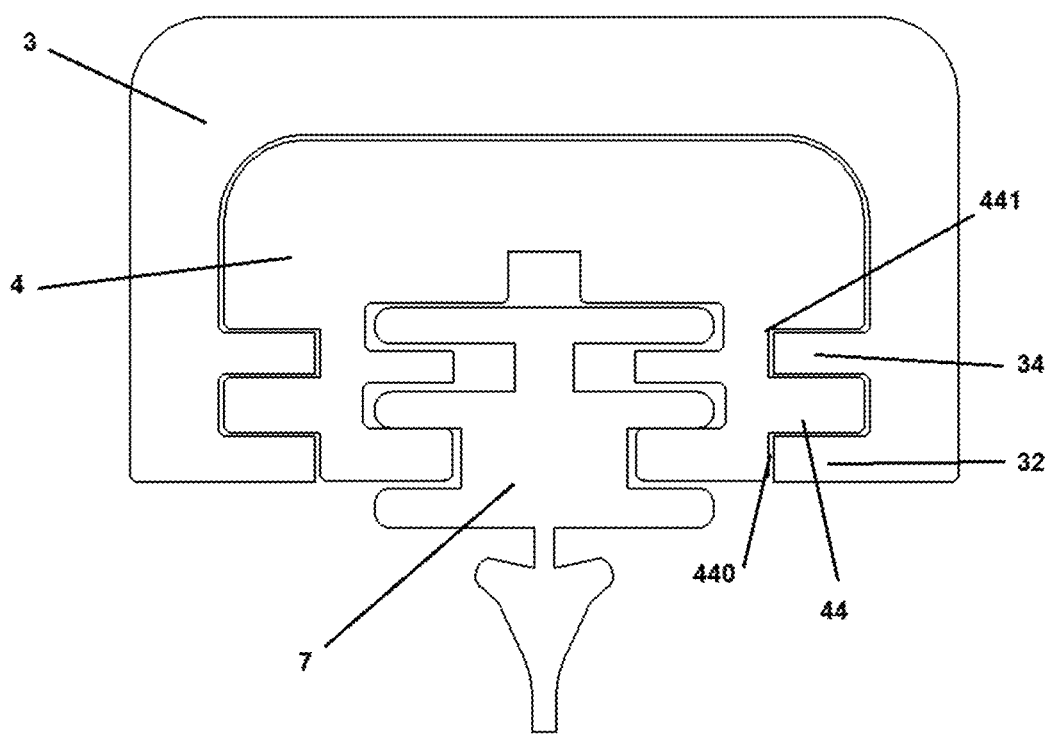
FIG. 34 illustrates a cross-sectional view of a cover, backing element and wiper strip of an alternative embodiment.

FIG. 34 illustrates an alternative manner in which the cover 3 can be secured to the backing element 4. In this embodiment, the cover 3 is provided with both a bottom claw 32 and a top claw 34. Similarly, the backing element 4 is provided with an outer rail 44, which defines a lower recess 440 and a channel cavity 441. In this manner the top claw 34 of the cover engages and secures the channel cavity 441 of the backing element 4, and the bottom claw 32 of the backing element 4 engages and secures the bottom recess 440 of the backing element. Persons of skill in the art will further recognize that the cover 3 may optionally have other backing element securing structures, such as pegs, detents, shoulders, projections, recesses, holes, and other such structures known in the art, along the bottom surface 38, the legs 31, the claws 32, 34, or the groove formed therebetween, such that these securing structures engage corresponding complementary securing structures in the backing element 4, such as holes, shoulders, detents, recesses, projections, pegs and other such structures known in the art, or that these structures can be reversed between the backing element 4 and the cover 3.

As discussed above, FIG. 35 illustrates an exemplary connector that may be used in accordance with the disclosed concepts to connect the mounting base to a wiper arm. Persons of skill in the art will recognize that any suitable connector known in the art may be used with the disclosed concepts, including those set forth above and incorporated by reference.

FIGS. 36-37 illustrate an alternative embodiment of the disclosed concept having a mounting base 2, a cover 3 having a spoiler, a backing element 4, a wiper strip 7, and vertebrae 6. As with the embodiment illustrated in FIGS. 1-2, any suitable mounting base, including the mounting base depicted in FIGS. 2-7 may be used in accordance with the disclosed concepts.

Figure 41:
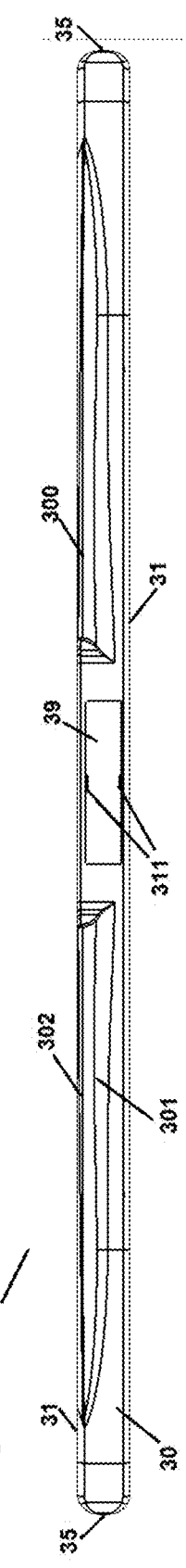
FIG. 41 illustrates a top view of the cover of the wiper blade shown in FIG. 36.
Figure 45:
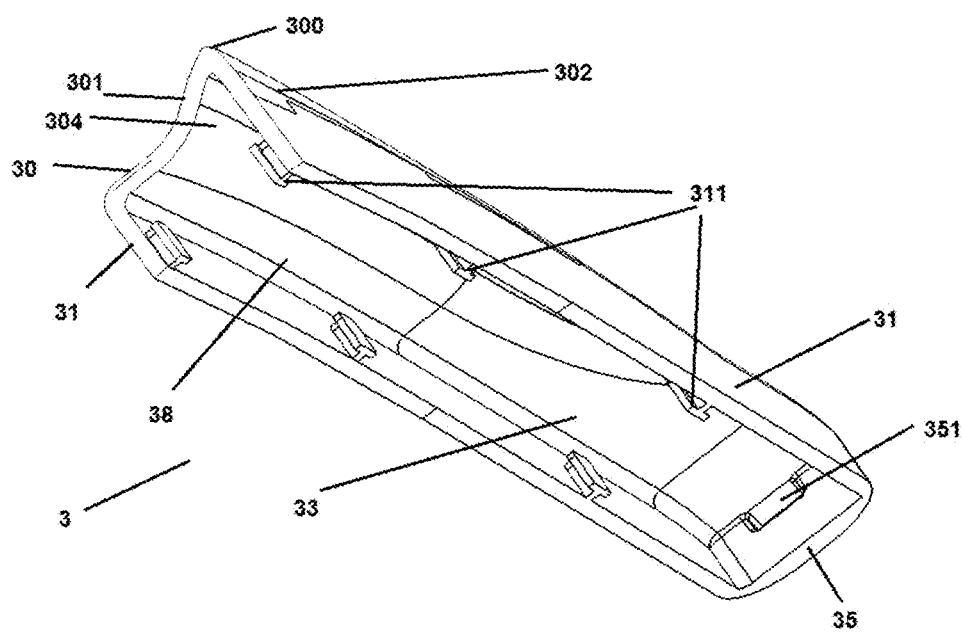
FIG. 45 illustrates a cross-sectioned perspective of an end of the cover of the wiper blade shown in FIG. 36.
Figure 46:
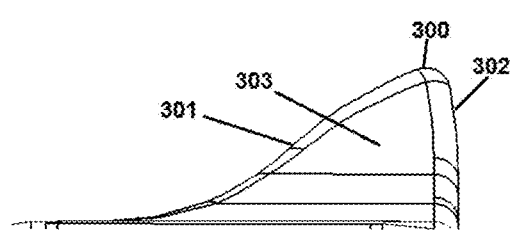
FIG. 46 illustrates the spoiler profile of the cover of the wiper blade shown in FIG. 36.
Figure 47:
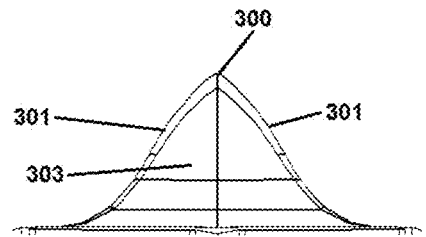
FIG. 47 illustrates an embodiment of a spoiler profile of a cover.
Figure 50:
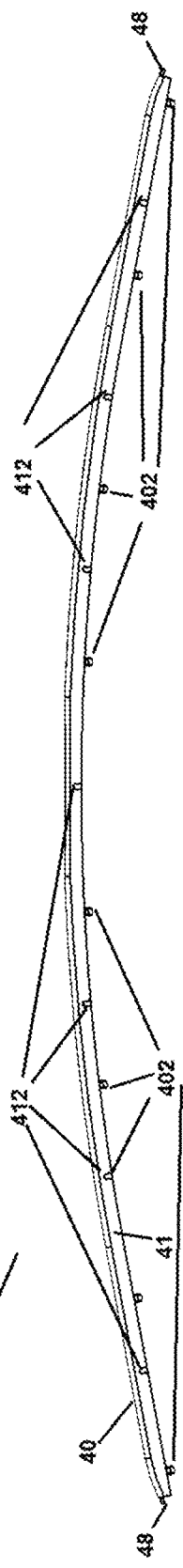
FIG. 50 illustrates a front view of the backing element of the wiper blade shown in FIG. 36.
Figure 51:
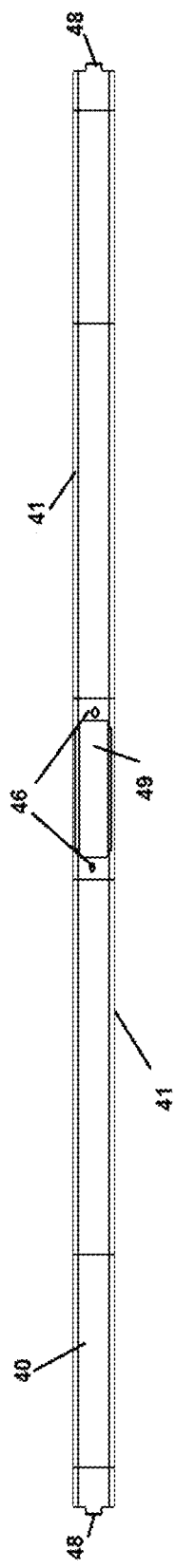
FIG. 51 illustrates a top view of the backing element of the wiper blade shown in FIG. 36.
Figure 52:
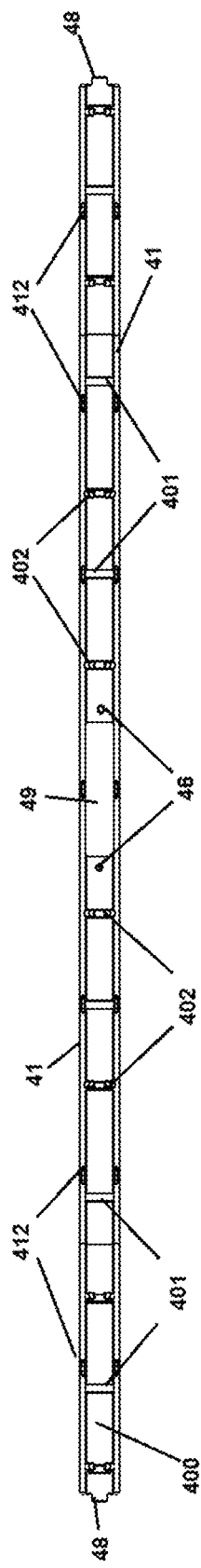
FIG. 52 illustrates a bottom view of the backing element of the wiper blade shown in FIG. 36.
Figure 53:
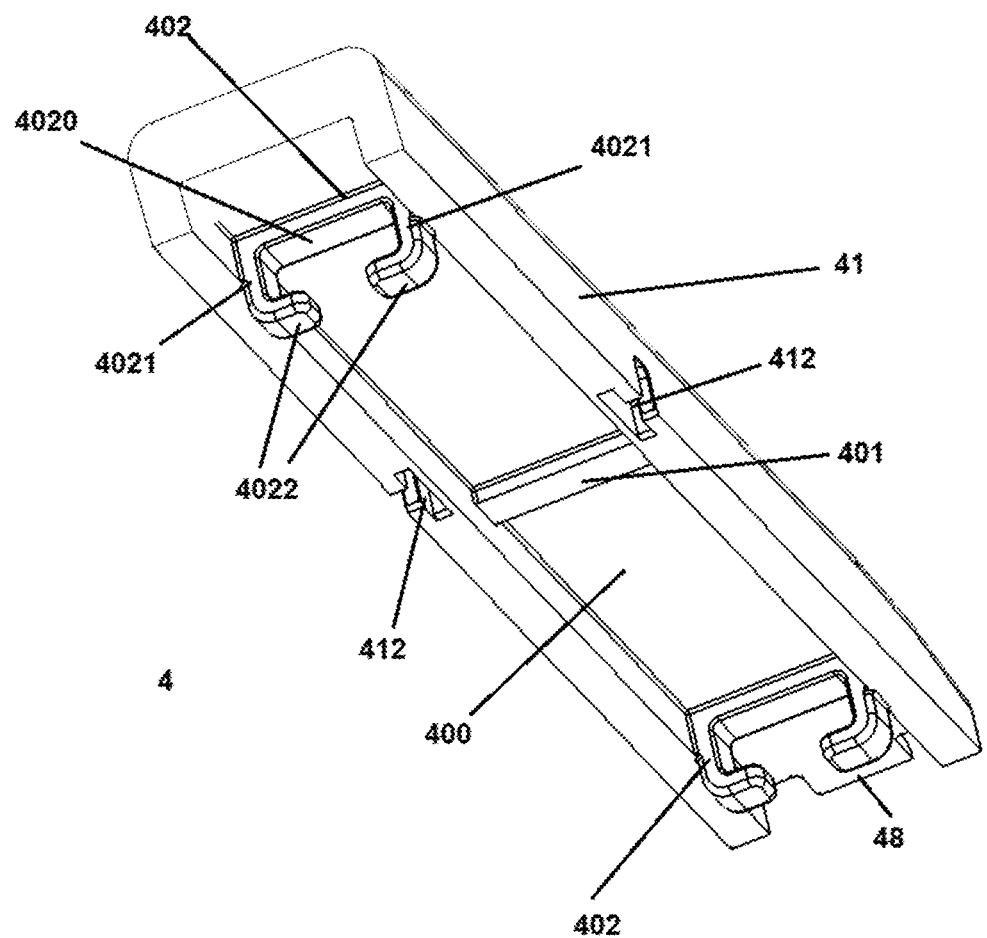
FIG. 53 illustrates a truncated perspective view from below of the end of the backing element of the wiper blade shown in FIG. 36.

FIGS. 38-46 illustrate the cover 3 of the embodiment shown in FIGS. 36-37. As shown in these figures, the top surface 30 of the cover 3 may form a spoiler having an apex 300, an attack surface 301, and a back surface 302. As shown in FIG. 46, the attack surface 302 may be concave. The cover may further have at least one leg 31, where the back surface 302 may blend into, or be in line with the leg 31. Thus the bottom portion of the back surface 302 may also be considered a leg 31. As discussed above, the apex 300 may be alternatively centered FIG. 47, and the back surface may also be provided with an attack surface 301 such that the spoiler forms an isosceles triangle (with or without concave attack surface sides) such that the front of the wiper blade 1 functions the same as the back of the wiper blade 1. As illustrated in FIG. 41, the apex 300 may end before the end of cover 3 and merge into the top surface 30 of the cover 3. A wall 303 may join the attack surface 301 and the back surface 302 near the center of the cover 3. An end wall 35 may be provided used to join the ends of the top surface 30 (including the spoiler 300, 301, 302,) and the leg(s) 31.

The top surface 30 may have a central opening 39, which may encircle and secure the mounting base 2. The spoiler 300, 301, 302 may be split into two spoiler sections on either side of the opening such that a gap 305 separates the spoiler sections and allows the mounting base to be disposed therein. Alternatively, as discussed above, the cover may be a one piece of unitary construction (as shown in FIGS. 36-46), or may comprise cover sections that join to each other, or are secured to the mounting base.

Figure 42:
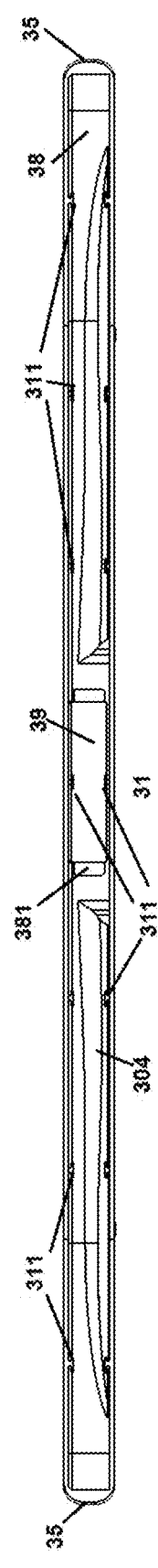
FIG. 42 illustrates a bottom view of the cover of the wiper blade shown in FIG. 36.
Figure 43:
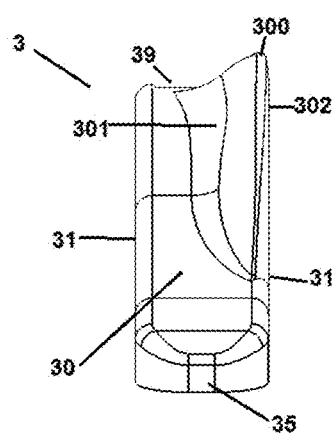
FIG. 43 illustrates a side view of the cover of the wiper blade shown in FIG. 36.
Figure 44:
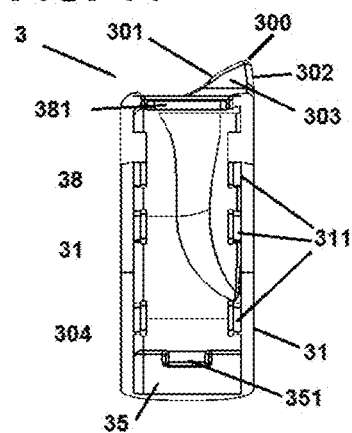
FIG. 44 illustrates a cross-sectioned side view of the cover of the wiper blade shown in FIG. 36.

As shown in FIGS. 37, 39, and 42 the end wall 35 may encapsulate and surround the wiper strip 7 and backing element 4. The end wall may further have a securing recess 351 which may receive an end projection 48 from the backing element 4.

The cover further has a bottom surface 38, which may be provided with mounting base recesses 381 to accommodate the base sections 24 of the mounting base 2. The bottom surface may have a spoiler cavity 304 formed by the surfaces opposite the attack surface 301 and the back surface 302. The spoiler cavity may serve to minimize the weight of the cover, the materials needed to construct same, and the impact of the cover on the distribution of force from a wiper arm. The bottom surface 38, together with the legs 31 and the end walls may define a backing element cavity 33, to receive the backing element 4. Each leg 31 may be provided with one or more interior projections 311 which engage and secure complementary detents 412 in the backing element. As shown in FIG. 45, the interior projections may be T-shaped, or may have any other suitable shaped that can be secured to a complementary structure in the backing element. Persons of ordinary skill in the art will recognize that the structure of interior projections 311 and the complementary detents 412 can be swapped between the cover 3 and backing element 4, and that any other suitable structure known in the art, including without limitation, projections, recesses detents, dove tails, etc., may be used to secure these structures to each other.

FIGS. 46-53 illustrate an exemplary backing element 4 in accordance with the disclosed concepts. The backing element 4 is preferably made of hard, sprint-elastic plastic, though any other suitable material or combination of materials known in the art, including metals, rubber, and resins, for example, may be used. In some embodiments the backing element 4, or portions thereof may be made from a material having a Shore Hardness A of 85±5 or greater. In some embodiments the backing element 4, or portions thereof may be made from a material having a Shore Hardness A of 95±5 or greater. In other embodiments, the backing element 4 may be made from multiple materials, or having multiple hardnesses. Persons of skill in the art will recognize that disclosed concepts may be implemented in many different ways, and different design choices may be made with respect to materials for all components, including the mounting base. The backing element may connect to the mounting base 2, which in turn is capable of connecting to a wiper arm directly or through the use of a connector 5 or adapter. The backing element 4 is pre-shaped and, alone or with the help of the vertebrae 6, distributes the force received from the wiper arm along the length of the wiper strip 7.

The elongate backing element 4 may have a top portion 40, from which two opposing legs 41 descend. As discussed above, the backing element 4 may have a central opening 49 to receive portions of the mounting base which extend below the base section 24, and securing holes 46 to receive and engage securing pegs 28 in the mounting base 2. As also discussed above, the backing element may also have other securing structures, including pegs, projections, detents, recesses, holes, shoulders, and any other suitable structure known in the art in order to engage and secure a complementary structure in the mounting base 2 or cover sections 3.

The legs 41 of the backing element 4 may have complementary detents 412, which receive and secure inner projections 311 on the legs 31 of the cover 3. As discussed above, other suitable structures for securing a cover to the backing element known in the art may also be used in accordance with the disclosed concepts.

The backing element 4 may also have a bottom surface 400 having one or more ribs 401 extending between the opposing legs 41 to add additional structural support.

Figure 55:
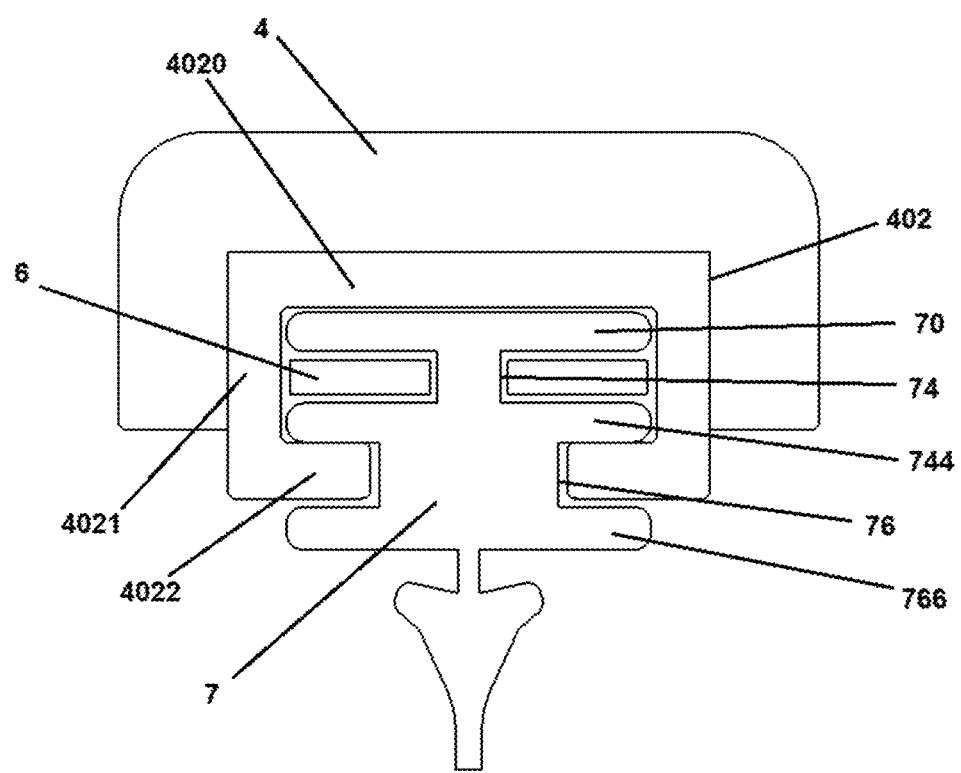
FIG. 55 illustrates a cross-sectional profile of the backing element, wiper strip and vertebrae of the wiper blade shown in FIG. 36.

Wiper strip clips 402 may also extend downwardly from the bottom surface 400 of the backing element 4, and secure the wiper strip to the backing element. Each wiper strip clip 402 may consist of a rib portion 4020 from which two legs 4021 descend, such that each leg 4021 may be provided with a claw 4022 oriented towards the opposite leg. As shown in FIG. 55, the legs 4021 of the wiper strip clip 402 may be sized to secure a wiper strip such that the top strip 70 is held against the rib portion 4020 of the wiper strip clip 402, and the legs extend past the top portion 75 groove 74 and intermediate arms 744 of the wiper strip 7 and position the claws 4021 within the securing groove 76 of the wiper strip 7. Vertebrae may be disposed within the grooves 74, such that the wiper strip clips 402 secure both the wiper strip 7 and the vertebrae 6 within the backing element 4.

As discussed above, FIG. 35 illustrates an exemplary connector that may be used in accordance with the disclosed concepts to connect the mounting base to a wiper arm. Persons of skill in the art will recognize that any suitable connector known in the art may be used with the disclosed concepts, including those set forth above and incorporated by reference.

Figure 54:
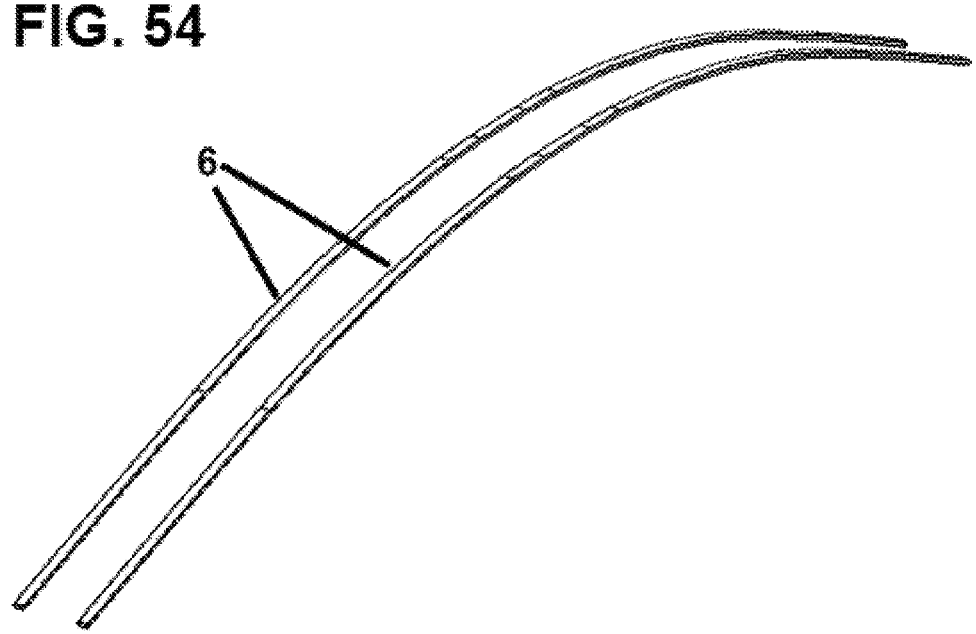
FIG. 54 illustrates the vertebrae of the backing element of the wiper blade shown in FIG. 36.

FIG. 54 illustrates vertebrae in accordance with the disclosed concepts. The vertebrae are preferably made out of metal, such as steel, though may be made from any suitable material. The vertebrae may be made from a spring-elastic material, including spring-elastic metal. Accordingly, the vertebrae 6 may with the backing element 4 distribute the force received from a wiper arm along the length of the wiper strip 7. Vertebrae 6 may also be disposed within grooves 74 in the top portion 75 of the wiper strip 7 and add lateral support to the wiper strip 7.

A type of plastic which can be used to make the backing element, and other structures of the disclosed wiper blades is glass-filled PPO (Modified PolyPhenyleneOxide). Other materials with similar physical properties are ABS, Acetal-Delrin, PET and PBT (Polyester) and Nylon. Glass-filled PPO has excellent thermal and electrical properties, an excellent and fire retardant rating (UL 94 V-1@0.058" thick), extremely low water/moisture absorption, very low thermal expansion, and is vacuum formable, machinable and bondable. It has good temperature resistance and is readily available in sheet or rod form. Glass-filled PPO has excellent machining capabilities, and can be used with tight tolerances, and is dimensionally stable at high continuous temperature (185 degrees F.; 265 degrees F.). However, as discussed above, any suitable material known in the art may be used in accordance with the disclosed concepts.

Those skilled in the art recognize that while the invention will most likely be used in conjunction with automobiles, it is suitable for use with any vehicle. For example, in addition to automobiles, trucks, buses, locomotives, aircrafts, or any other vehicle type that uses a windshield wiper can benefit from the invention.

While specific embodiments have been discussed to illustrate the invention, it will be understood by those skilled in the art that the descriptions herein are intended as illustrative, and not as limiting, and that variations in the embodiments can be made without departing from the spirit of the invention.

Accordingly, the foregoing descriptions are intended as illustrative, and not as limiting.

I claim:

1. A wiper blade comprising:
a wiper strip having a wide portion, a top portion, and a lip;
an elongate backing element having a top portion and two opposing legs that descend from the top portion, wherein each opposing leg has a claw that extends towards the other opposing leg such that a gap between the claws is narrower than a width of the wide portion of the wiper strip, wherein the claws, legs, and top portion define a wiper strip cavity sized to receive the wide portion of the wiper strip; and
a wiper sleeve having a sleeve base from which two opposing sleeve legs descend, each sleeve leg having a claw that extends towards the opposing sleeve leg, wherein the sleeve base, sleeve legs, and sleeve claws define a sleeve cavity and the sleeve cavity is sized to receive a top strip on the top portion of the wiper strip, wherein the wiper sleeve further comprises a tongue on a top surface of the sleeve base and the backing element further comprises an upper recess sized to receive the tongue.

2. The wiper blade of claim 1 wherein the wiper strip further comprises an intermediate portion having a securing groove; wherein the gap between the claws is sized to receive the intermediate portion of the wiper strip by engaging the securing groove.

3. The wiper blade of claim 1 wherein the backing element further comprises at least one vertical projection extending downward from the legs.

4. The wiper blade of claim 3 wherein the at least one vertical projection extends even with, the bottom of the claws.

5. The wiper blade of claim 4 further comprising a cover having at least one notch that engages the at least one vertical projection.

6. The wiper blade of claim 1 further comprising a cover having a top surface from which two opposing legs descend, and two end walls that join the top surface and legs of the cover at respective ends of the cover; wherein the cover is disposed on and covers the backing element.

7. The wiper blade of claim 6 wherein in the backing element further comprises a first end and a second end, each end having an end projection, and the end walls of the cover further each comprise a securing recess which receives one of the end projections of the backing element.

8. The wiper blade of claim 6 wherein each opposing leg of the cover further comprises a bottom claw extending towards the opposing leg of the cover.

9. The wiper blade of claim 1 further comprising a mounting base having a base section that is secured on the top portion of the backing element.

10. The wiper blade of claim 9 wherein the backing element has a central recess, wherein the mounting base has a structure extending below the base section wherein the central recess is sized and shaped to the structure.

11. The wiper blade of claim 9 further comprising a cover having a central recess that encircles the mounting base.

12. The wiper blade of claim 9 wherein the base section of the mounting base further comprises at least one securing peg, and the top portion of the backing element comprises at least one securing hole, such that at least one securing hole receives and secures the at least one securing peg.

13. The wiper blade of claim 1 further comprising a cover having top surface comprising a spoiler.

14. The wiper blade of claim 1 further comprising a cover having interior projections that engage complementary detents in the backing element.

15. The wiper blade of claim 14 wherein the interior projections are T-shaped.

16. A wiper blade comprising:
a wiper strip having a wide portion and a lip;
an elongate backing element having a top portion and two opposing legs that descend from the top portion, wherein each opposing leg has a claw that extends towards the other opposing leg such that a gap between the claws is narrower than a width of the wide portion of the wiper strip, wherein the claws, legs, and top portion define a wiper strip cavity sized to receive the wide portion of the wiper strip; and
a mounting base having
a base section that is secured on the top portion of the backing element,
opposing vertical side walls extending above and below the base section, and
a rivet disposed between the opposed vertical side walls,
wherein the elongate backing element further includes a central recess sized and shaped to receive a portion of the opposing vertical side walls that extend below the base section.

17. The wiper blade of claim 16 further comprising a cover having a central cover recess that encircles the mounting base.

18. The wiper blade of claim 16 wherein the base section of the mounting base further comprises at least one securing peg, and the top portion of the backing element comprises at least one securing hole such that the at least one securing hole receive and secures the at least one securing peg.

19. A wiper blade comprising:
a wiper strip having a wide portion, a top portion, and a lip;
an elongate backing element having a top portion and two opposing legs that descend from the top portion, wherein each opposing leg has a claw that extends towards the other opposing leg such that a gap between the claws is narrower than a width of the wide portion of the wiper strip, wherein the claws, legs, and top portion define a wiper strip cavity sized to receive the wide portion of the wiper strip;
a mounting base having
a base section that is secured on the top portion of the backing element,
opposing vertical side walls extending above and below the base section, and
a rivet disposed between the opposed vertical side walls; and
a wiper sleeve having a sleeve base from which two opposing sleeve legs descend, each sleeve leg having a claw that extends towards the opposing sleeve leg, wherein the sleeve base, sleeve legs, and sleeve claws define a sleeve cavity and the sleeve cavity is sized to receive a top strip on the top portion of the wiper strip, wherein the wiper sleeve further comprises a tongue on a top surface of the sleeve base and the back element further comprises an upper recess sized to receive the tongue, and wherein the elongate backing element further includes a central recess sized and shaped to receive a portion of the opposing vertical side walls that extend below the base section.

20. The wiper blade of claim 19 further comprising a cover having a central cover recess that encircles the mounting base.

* * * * *